United States Patent
Hu et al.

(10) Patent No.: US 11,564,099 B2
(45) Date of Patent: Jan. 24, 2023

(54) RRC CONNECTION RESUME METHOD AND APPARATUS

(71) Applicant: HUAWEI TECHNOLOGIES CO., LTD., Guangdong (CN)

(72) Inventors: Li Hu, Shanghai (CN); Bingzhao Li, Beijing (CN); Xiaoying Xu, Shanghai (CN); Jing Chen, Shanghai (CN); He Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 298 days.

(21) Appl. No.: 16/859,699

(22) Filed: Apr. 27, 2020

(65) Prior Publication Data
US 2020/0260283 A1 Aug. 13, 2020

Related U.S. Application Data

(63) Continuation of application No. PCT/CN2018/112770, filed on Oct. 30, 2018.

(30) Foreign Application Priority Data

Oct. 31, 2017 (CN) .......................... 201711050848.5
Apr. 3, 2018 (CN) .......................... 201810289244.4

(51) Int. Cl.
*H04L 29/06* (2006.01)
*H04W 12/106* (2021.01)
(Continued)

(52) U.S. Cl.
CPC ............. *H04W 12/106* (2021.01); *H04L 9/14* (2013.01); *H04W 12/037* (2021.01);
(Continued)

(58) Field of Classification Search
CPC ............. H04W 12/106; H04W 12/037; H04W 12/041; H04W 36/08; H04W 76/27;
(Continued)

(56) References Cited

U.S. PATENT DOCUMENTS 11,304,054 B2 * 4/2022 Chai .................... H04W 12/037
2012/0308007 A1 12/2012 Li et al.
(Continued)

FOREIGN PATENT DOCUMENTS

| CN | 101702818 A | 5/2010 |
| CN | 102083063 A | 6/2011 |

(Continued)

OTHER PUBLICATIONS

Huawei, HiSilicon, Security of Inactive to Connected state transition. 3GPP TSP-RAN WG2#99bis Meeting, Prague, Czech Republic, 9th-13th, Oct. 2017, R2-1710568, 4 pages.

(Continued)

*Primary Examiner* — John B King
(74) *Attorney, Agent, or Firm* — Womble Bond Dickinson (US) LLP

(57) ABSTRACT

This application provides an RRC connection resume method and apparatus. In the method, when a terminal moves to a target base station, the target base station may reselect, based on a capability and a requirement of the target base station, a first encryption algorithm and a first integrity protection algorithm that are used when the target base station communicates with the terminal, and send the first encryption algorithm and the first integrity protection algorithm to the terminal. On one hand, a security algorithm used for communication between the terminal and the target base station is flexibly selected. On the other hand, because the base station connected to the terminal changes, communi- (Continued)

cation security can be improved by using a new encryption algorithm and integrity protection algorithm.

20 Claims, 5 Drawing Sheets

(51) Int. Cl.
    *H04W 76/27*     (2018.01)
    *H04L 9/14*     (2006.01)
    *H04W 36/08*     (2009.01)
    *H04W 12/037*     (2021.01)
    *H04W 12/041*     (2021.01)

(52) U.S. Cl.
    CPC ......... *H04W 12/041* (2021.01); *H04W 36/08* (2013.01); *H04W 76/27* (2018.02)

(58) Field of Classification Search
    CPC ........ H04W 12/03; H04W 76/19; H04L 9/14; H04L 9/0891; H04L 63/205
    See application file for complete search history.

(56) References Cited

U.S. PATENT DOCUMENTS

| | | | |
|---|---|---|---|
| 2013/0039339 A1 | 2/2013 | Rayavarapu et al. | |
| 2015/0373602 A1* | 12/2015 | Hampel | H04W 36/08 455/437 |
| 2016/0174112 A1* | 6/2016 | Liu | H04L 9/0816 370/331 |
| 2017/0202050 A1 | 7/2017 | Deng | |
| 2017/0339612 A1* | 11/2017 | Quan | H04W 68/02 |
| 2018/0091485 A1* | 3/2018 | Lee | H04W 12/041 |
| 2018/0206080 A1* | 7/2018 | Chen | H04W 72/005 |
| 2018/0213575 A1* | 7/2018 | Chen | H04W 76/27 |
| 2018/0278592 A1* | 9/2018 | Zhang | H04W 88/10 |
| 2018/0343566 A1* | 11/2018 | Yu | H04W 12/041 |
| 2019/0150218 A1* | 5/2019 | Futaki | H04W 76/19 370/329 |
| 2020/0214070 A1* | 7/2020 | Ingale | H04W 74/0833 |

FOREIGN PATENT DOCUMENTS

| | | | | |
|---|---|---|---|---|
| CN | 102137400 | A | 7/2011 | |
| CN | 102264064 | A | 11/2011 | |
| CN | 103858512 | A | 6/2014 | |
| CN | 106961712 | A | 7/2017 | |
| CN | 107277939 | A | 10/2017 | |
| CN | 109309918 | B * | 6/2021 | ............ H04W 12/04 |
| EP | 2528403 | A1 | 11/2012 | |
| EP | 2648437 | A1 * | 10/2013 | ........... H04L 63/061 |
| WO | 2017048170 | A1 | 3/2017 | |

OTHER PUBLICATIONS

3GPP TSG-RAN WG2#99bis,R2-1710569:"Remaining issues on State transition between RCR Connected and Inactive",Huawei, HiSilicon,Prague, Czech Republic, Oct. 9-13,total 6 pages.
ETSI TS 136 300 V14.2.0:LTE;Evolved Universal Terrestrial Radio Access (E-UTRA) andEvolved Universal Terrestrial Radio Access Network (E-UTRAN);Overall description;Stage 2 (3GPP TS 36.300 version 14.2.0 Release 14),Apr. 2017total 346 pages.
3GPP TSG-RAN WG3 Meeting #97bis,R3-173848,Discussions on Inactive to Connected RRC transition within high-layer split,Samsung. Prague, Czech, 9th Oct. 13, 2017,total 4 pages.
3GPP TSG SA WG3 (Security) Meeting #88Bis Adhoc,S3-172261:"pCR to TS 33.501: Security Handling at Transition from RRC-Inactive to RRC-Connected transition",Huawei, Hisilicon,Singapore, 9th Oct. 13, 2017,total 2 pages.
3GPP TS 36.331 V13.2.0 (Jun. 2016),3rd Generation Partnership Project;Technical Specification Group Radio Access Network;Evolved Universal Terrestrial Radio Access (E-UTRA); Radio Resource Control (RRC);Protocol specification (Release 13), total 623 pages.
Ericsson,"Security for RRC Connection Suspend and Resume procedure in solution 18 for Narrow Band CIoT", 3GPP TSG-SA WG3 Meeting #82, S3-160157, Dubrovnik, Croatia, Feb. 1-5, 2016, total 7 pages.
Huawei, HiSilicon, on potential issues for signalling Msg3 size. 3GPP TSG-RAN WG2 NR Ad Hoc, Qingdao, China, Jun. 27-29, 2017, R2-1706464, 5 pages.

* cited by examiner

RRC CONNECTION RESUME METHOD AND APPARATUS

CROSS-REFERENCE TO RELATED APPLICATIONS

This application is a continuation of International Application No. PCT/CN2018/112770, filed on Oct. 30, 2018, which claims priority to Chinese Patent Application No. 201711050848.5, filed on Oct. 31, 2017 and Chinese Patent Application No. 201810289244.4, filed on Apr. 3, 2018, all of which are incorporated herein by reference in their entireties.

TECHNICAL FIELD

This application relates to the field of mobile communications technologies, and in particular, to a radio resource control (RRC) connection resume method and apparatus.

BACKGROUND

In long term evolution (LTE), suspension and resume procedures may be applied to narrowband internet of things (NB-IoT) terminals, to be specific, internet of things devices with relatively low mobility or low power consumption, for example, a smart water meter.

When a base station instructs, in a suspension manner, a terminal to release a current connection, the terminal and the base station delete some contexts on an access stratum, and reserve some contexts on the access stratum, for example, an access stratum key, a security capability of the terminal, and a currently selected security algorithm. Then, the terminal enters an inactive state from a connected state. When the terminal expects to resume the connection to the base station, the terminal can quickly restore from the inactive state to the connected state.

In a 5th generation (5G) system and a future communications system, the service procedures may be extended, and the suspension and resume procedures are applied to enhanced mobile broadband (eMBB) terminals such as a smartphone.

Because mobility of the terminal is relatively high, the terminal is handed over between different base stations at a relatively high frequency. In this case, how to improve security and flexibility of restoring the terminal from the inactive state to the connected state is a problem to be resolved.

SUMMARY

This application provides an RRC connection resume method and apparatus, to improve security and flexibility of restoring a terminal from an inactive state to a connected state.

To achieve the foregoing objective, this application provides following technical solutions:

In one embodiment, this application provides an RRC connection resume method, including: sending, by a terminal, a connection resume request message to a target base station, where the connection resume request message is used to request to resume a radio resource control RRC connection; obtaining, by the terminal, a first encryption algorithm and a first integrity protection algorithm that are from the target base station, where the first encryption algorithm is an encryption algorithm negotiated by the terminal and the target base station, and the first integrity protection algorithm is an integrity protection algorithm negotiated by the terminal and the target base station; obtaining, by the terminal, a protected connection resume completion message based on the first encryption algorithm, the first integrity protection algorithm, and a connection resume completion message, where the connection resume completion message is used to indicate that the RRC connection has been resumed; and sending, by the terminal, the protected connection resume completion message to the target base station.

In the method, when the terminal moves to the target base station, the terminal sends the connection resume request message to the target base station, then the target base station reselects, based on a capability and a requirement of the target base station, the first encryption algorithm and the first integrity protection algorithm that are used when the target base station communicates with the terminal, and sends the first encryption algorithm and the first integrity protection algorithm to the terminal. On one hand, a security algorithm used for communication between the terminal and the target base station is flexibly selected. On the other hand, because the base station connected to the terminal changes, communication security can be improved by using a new encryption algorithm and integrity protection algorithm.

In one embodiment, the obtaining, by the terminal, of the first encryption algorithm and the first integrity protection algorithm that are from the target base station includes: receiving, by the terminal, a connection resume response message from the target base station, where the connection resume response message includes the first encryption algorithm and the first integrity protection algorithm, the connection resume response message is used to instruct the terminal to resume the RRC connection, the connection resume response message is encrypted based on a second encryption key, the second encryption key is generated based on a second encryption algorithm, and the second encryption algorithm is an encryption algorithm negotiated by the terminal and a source base station; generating, by the terminal, the second encryption key based on the second encryption algorithm, and decrypting the connection resume response message based on the second encryption key and the second encryption algorithm; and obtaining, by the terminal, the first encryption algorithm and the first integrity protection algorithm from the decrypted connection resume response message.

In one embodiment, integrity protection is performed on the connection resume response message based on a second integrity protection key and a second integrity protection algorithm, the second integrity protection key is generated based on the second integrity protection algorithm, and the second integrity protection algorithm is an integrity protection algorithm negotiated by the terminal and the source base station; and the method further includes: generating, by the terminal, the second integrity protection key based on the second integrity protection algorithm; and performing, by the terminal, integrity check on the connection resume response message based on the second integrity protection key and the second integrity protection algorithm.

In one embodiment, the obtaining, by the terminal, of the first encryption algorithm and the first integrity protection algorithm that are from the target base station includes: receiving, by the terminal, a connection resume response message and the first encryption algorithm that are from the target base station, where the connection resume response message includes the first integrity protection algorithm, the connection resume response message is used to instruct the terminal to resume the RRC connection, the connection resume response message is encrypted based on a first encryption key and the first encryption algorithm, and the first encryption key is generated based on the first encryption algorithm; obtaining, by the terminal, the first encryption algorithm, and generating the first encryption key based on the first encryption algorithm; and decrypting, by the terminal, the connection resume response message based on the first encryption key and the first encryption algorithm, and obtaining the first integrity protection algorithm from the decrypted connection resume response message.

In one embodiment, the obtaining, by the terminal, of the first encryption algorithm and the first integrity protection algorithm that are from the target base station includes: receiving, by the terminal, a connection resume response message, the first encryption algorithm, and the first integrity protection algorithm that are from the target base station, where the connection resume response message is used to instruct the terminal to resume the RRC connection, the connection resume response message is encrypted based on a first encryption key and the first encryption algorithm, and the first encryption key is generated based on the first encryption algorithm.

In one embodiment, integrity protection is performed on the connection resume response message based on a first integrity protection key and the first integrity protection algorithm, and the first integrity protection key is generated based on the first integrity protection algorithm; and the method further includes: generating, by the terminal, the first integrity protection key based on the first integrity protection algorithm; and performing, by the terminal, integrity check on the connection resume response message based on the first integrity protection key and the first integrity protection algorithm.

In one embodiment, the obtaining, by the terminal, of the first encryption algorithm and the first integrity protection algorithm that are from the target base station includes: receiving, by the terminal, a first message from the target base station, where the first message includes the first encryption algorithm and the first integrity protection algorithm.

In one embodiment, after the receiving, by the terminal, of the first message from the target base station, the method further includes: receiving, by the terminal, a connection resume response message from the target base station, where the connection resume response message is used to instruct the terminal to resume the RRC connection, and security protection is performed on the connection resume response message based on the first encryption algorithm and the first integrity protection algorithm.

In one embodiment, integrity protection is performed on the first message based on a first integrity protection key and the first integrity protection algorithm, and the first integrity protection key is generated based on the first integrity protection algorithm; and the method further includes: generating, by the terminal, the first integrity protection key based on the first integrity protection algorithm; and performing, by the terminal, integrity check on the first message based on the first integrity protection key and the first integrity protection algorithm.

In one embodiment, the first message further includes first instruction information, and the first instruction information is used to instruct the terminal not to update an access stratum key; and the generating, by the terminal, the first integrity protection key based on the first integrity protection algorithm includes: generating, by the terminal, the first integrity protection key based on a current access stratum key and the first integrity protection algorithm.

In one embodiment, the terminal determines that the first message does not include second instruction information, where the second instruction information is used to instruct the terminal to update an access stratum key; and the generating, by the terminal, the first integrity protection key based on the first integrity protection algorithm includes: generating, by the terminal, the first integrity protection key based on a current access stratum key and the first integrity protection algorithm.

In one embodiment, the method further includes: sending, by the terminal, a second message to the target base station, where the second message is used to respond to the first message.

In one embodiment, the first message is a security mode command message or an RRC reconfiguration message.

In various embodiments, several methods for sending, by the base station, the first encryption algorithm and the first integrity protection key to the terminal are provided. In an actual application, selection may be flexibly performed according to an actual requirement.

In one embodiment, this application provides an RRC connection resume method, including: sending, by a terminal, a connection resume request message to a target base station, where the connection resume request message is used to request to resume a radio resource control RRC connection; obtaining, by the terminal, a protected connection resume completion message based on a second encryption algorithm, a second integrity protection algorithm, and the connection resume completion message if the terminal does not receive a first encryption algorithm and a first integrity protection algorithm that are from the target base station; or obtaining, by the terminal, a protected connection resume completion message based on a first encryption algorithm, a first integrity protection algorithm, and the connection resume completion message if the terminal receives the first encryption algorithm and the first integrity protection algorithm that are from the target base station; and sending, by the terminal, the protected connection resume completion message to the target base station, where the first encryption algorithm is an encryption algorithm and an integrity protection algorithm that are negotiated by the terminal and the target base station, the first integrity protection algorithm is an integrity protection algorithm negotiated by the terminal and the target base station, the second encryption algorithm is an encryption algorithm negotiated by the terminal and a source base station, the second integrity protection algorithm is an integrity protection algorithm negotiated by the terminal and the source base station, and the connection resume completion message is used to indicate that the RRC connection has been resumed.

In the method, when the terminal moves to the target base station, the terminal sends the connection resume request message to the target base station, then the target base station reselects, based on a capability and a requirement of the target base station, the first encryption algorithm and the first integrity protection algorithm that are used when the target base station communicates with the terminal. If the target base station determines that the first encryption algorithm is the same as the second encryption algorithm and that the first integrity protection algorithm is the same as the second integrity protection algorithm, the target base station does not send the selected first encryption algorithm and the selected first integrity protection algorithm to the terminal. Correspondingly, if the terminal determines that the first encryption algorithm and the first integrity protection algorithm are not received, the terminal generates the protected connection resume completion message by using the second encryption algorithm and the second integrity protection algorithm. If the target base station determines that the first encryption algorithm is different from the second encryption algorithm or that the first integrity protection algorithm is different from the second integrity protection algorithm, the target base station sends the first encryption algorithm and the first integrity protection algorithm to the terminal. Correspondingly, if the terminal determines that the first encryption algorithm and the first integrity protection algorithm are received, the terminal generates the protected connection resume completion message by using the first encryption algorithm and the first integrity protection algorithm. On one hand, a security algorithm used for communication between the terminal and the target base station is flexibly selected. On the other hand, because the base station connected to the terminal changes, communication security can be improved by using a new encryption algorithm and integrity protection algorithm.

In addition, when the target base station determines that the first encryption algorithm is the same as the second encryption algorithm and that the first integrity protection algorithm is the same as the second integrity protection algorithm, the target base station does not send the first encryption algorithm and the first integrity protection algorithm to the terminal, thereby reducing overheads.

In one embodiment, this application provides an RRC connection resume method, including: receiving, by a target base station, a connection resume request message from a terminal, where the connection resume request message is used to request to resume a radio resource control RRC connection; selecting, by the target base station, a first encryption algorithm and a first integrity protection algorithm based on a security capability of the terminal, where the security capability of the terminal includes an encryption algorithm and an integrity protection algorithm that are supported by the terminal; sending, by the target base station, the first encryption algorithm and the first integrity protection algorithm to the terminal; and receiving, by the target base station, a protected connection resume completion message from the terminal, and obtaining the connection resume completion message based on the protected connection resume completion message, the first encryption algorithm, and the first integrity protection algorithm, where the connection resume completion message is used to indicate that the RRC connection has been resumed.

In the method, when the terminal moves to the target base station, the target base station receives the connection resume request message sent by the terminal, then the target base station reselects, based on a capability and a requirement of the target base station, the first encryption algorithm and the first integrity protection algorithm that are used when the target base station communicates with the terminal, and sends the first encryption algorithm and the first integrity protection algorithm to the terminal. On one hand, a security algorithm used for communication between the terminal and the target base station is flexibly selected. On the other hand, because the base station connected to the terminal changes, communication security can be improved by using a new encryption algorithm and integrity protection algorithm.

In one embodiment, the method further includes: receiving, by the target base station, a second encryption algorithm from a source base station, where the second encryption algorithm is an encryption algorithm negotiated by the terminal and the source base station; and the sending, by the target base station, the first encryption algorithm and the first integrity protection algorithm to the terminal includes: generating, by the target base station, a second encryption key based on the second encryption algorithm; encrypting, by the target base station, a connection resume response message based on the second encryption key and the second encryption algorithm, where the connection resume response message includes the first encryption algorithm and the first integrity protection algorithm, and the connection resume response message is used to instruct the terminal to resume the RRC connection; and sending, by the target base station, the encrypted connection resume response message to the terminal.

In one embodiment, the method further includes: generating, by the target base station, a second integrity protection key based on a second integrity protection algorithm, where the second integrity protection algorithm is an integrity protection algorithm negotiated by the terminal and the source base station; and performing, by the target base station, integrity protection on the connection resume response message based on the second integrity protection key and the second integrity protection algorithm.

In one embodiment, the sending, by the target base station, of the first encryption algorithm and the first integrity protection algorithm to the terminal includes: generating, by the target base station, a first encryption key based on the first encryption algorithm; encrypting, by the target base station, the connection resume response message based on the first encryption key and the first encryption algorithm, where the connection resume response message includes the first integrity protection algorithm, and the connection resume response message is used to instruct the terminal to resume the RRC connection; and sending, by the target base station, the connection resume response message and the first encryption algorithm to the terminal.

In one embodiment, the sending, by the target base station, of the first encryption algorithm and the first integrity protection algorithm to the terminal includes: generating, by the target base station, a first encryption key based on the first encryption algorithm; encrypting, by the target base station, the connection resume response message based on the first encryption key and the first encryption algorithm, where the connection resume response message is used to instruct the terminal to resume the RRC connection; and sending, by the target base station, the connection resume response message, the first encryption algorithm, and the first integrity protection algorithm to the terminal.

In one embodiment, the method further includes: generating, by the target base station, a first integrity protection key based on the first integrity protection algorithm; and performing, by the target base station, integrity protection on the connection resume response message based on the first integrity protection key and the first integrity protection algorithm.

In one embodiment, the sending, by the target base station, of the first encryption algorithm and the first integrity protection algorithm to the terminal includes: sending, by the target base station, a first message to the terminal, where the first terminal includes the first encryption algorithm and the first integrity protection algorithm.

In one embodiment, after the sending, by the target base station, a first message to the terminal, the method further includes: performing, by the target base station, security protection on the connection resume response message based on the first encryption algorithm and the first integrity protection algorithm; and sending, by the target base station, the connection resume response message to the terminal.

In one embodiment, the method further includes: generating, by the target base station, a first integrity protection key based on the first integrity protection algorithm; and performing, by the target base station, integrity protection on the first message based on the first integrity protection key and the first integrity protection algorithm.

In one embodiment, the generating, by the target base station, of the first integrity protection key based on the first integrity protection algorithm includes: generating, by the target base station, the first integrity protection key based on a current access stratum key and the first integrity protection algorithm.

In one embodiment, the first message further includes first instruction information, and the first instruction information is used to instruct the terminal not to update the access stratum key.

In one embodiment, the method further includes: receiving, by the target base station, a second message from the terminal, where the second message is used to respond to the first message.

In one embodiment, the first message is a security mode command message or an RRC reconfiguration message.

In one embodiment, this application provides an RRC connection resume method, including: receiving, by a target base station, a connection resume request message from a terminal, where the connection resume request message is used to request to resume a radio resource control RRC connection; selecting, by the target base station, a first encryption algorithm and a first integrity protection algorithm based on a security capability of the terminal, where the security capability of the terminal includes an encryption algorithm and an integrity protection algorithm that are supported by the terminal;

if the first encryption algorithm is the same as a second encryption algorithm, and the first integrity protection algorithm is the same as a second integrity protection algorithm, sending, by the target base station, a connection resume response message to the terminal, where the connection resume response message is used to instruct the terminal to resume the RRC connection; and receiving a protected connection resume completion message from the terminal, and obtaining the connection resume completion message based on the protected connection resume completion message, the second encryption algorithm, and the second integrity protection algorithm; or if the first encryption algorithm is different from a second encryption algorithm, or the first integrity protection algorithm is different from a second integrity protection algorithm, sending, by the target base station, the first encryption algorithm and the first integrity protection algorithm to the terminal; and receiving a protected connection resume completion message from the terminal, and obtaining the connection resume completion message based on the protected connection resume completion message, the first encryption algorithm, and the first integrity protection algorithm, where the first encryption algorithm is an encryption algorithm and an integrity protection algorithm that are negotiated by the terminal and the target base station, the first integrity protection algorithm is an integrity protection algorithm negotiated by the terminal and the target base station, the second encryption algorithm is an encryption algorithm negotiated by the terminal and a source base station, the second integrity protection algorithm is an integrity protection algorithm negotiated by the terminal and the source base station, and the connection resume completion message is used to indicate that the RRC connection has been resumed.

In the method, when the terminal moves to the target base station, the target base station receives the connection resume request message sent by the terminal, then the target base station reselects, based on a capability and a requirement of the target base station, the first encryption algorithm and the first integrity protection algorithm that are used when the target base station communicates with the terminal. If the target base station determines that the first encryption algorithm is the same as the second encryption algorithm and that the first integrity protection algorithm is the same as the second integrity protection algorithm, the target base station does not send the selected first encryption algorithm and the selected first integrity protection algorithm to the terminal. Correspondingly, if the terminal determines that the first encryption algorithm and the first integrity protection algorithm are not received, the terminal generates the protected connection resume completion message by using the second encryption algorithm and the second integrity protection algorithm. If the target base station determines that the first encryption algorithm is different from the second encryption algorithm or that the first integrity protection algorithm is different from the second integrity protection algorithm, the target base station sends the first encryption algorithm and the first integrity protection algorithm to the terminal. Correspondingly, if the terminal determines that the first encryption algorithm and the first integrity protection algorithm are received, the terminal generates the protected connection resume completion message by using the first encryption algorithm and the first integrity protection algorithm. On one hand, a security algorithm used for communication between the terminal and the target base station is flexibly selected. On the other hand, because the base station connected to the terminal changes, communication security can be improved by using a new encryption algorithm and integrity protection algorithm.

In addition, when the target base station determines that the first encryption algorithm is the same as the second encryption algorithm and that the first integrity protection algorithm is the same as the second integrity protection algorithm, the target base station does not send the first encryption algorithm and the first integrity protection algorithm to the terminal, thereby reducing overheads.

In one embodiment, this application provides an apparatus. The apparatus may be a terminal, or may be a chip in a terminal. The apparatus has functions of implementing various embodiments of the first aspect. The function may be implemented by hardware, or may be implemented by hardware executing corresponding software. The hardware or the software includes one or more modules corresponding to the foregoing functions.

In one embodiment, when the apparatus is a terminal, the terminal includes a receiving unit, a sending unit, and a processing unit. The processing unit may be, for example, a processor, the receiving unit may be, for example, a receiver, and the sending unit may be, for example, a transmitter. The receiver and the transmitter include a radio frequency circuit. Optionally, the terminal further includes a storage unit, and the storage unit may be, for example, a memory. When the terminal includes the storage unit, the storage unit stores a computer-executable instruction. The processing unit is connected to the storage unit. The processing unit executes the computer-executable instruction stored in the storage unit, to enable the terminal to perform the RRC connection resume method in any one of the first aspect.

In one embodiment, when the apparatus is a chip in a terminal, the chip includes a receiving unit, a sending unit, and a processing unit. The processing unit may be, for example, a processing circuit. The receiving unit may be, for example, an input interface, a pin, or a circuit. The sending unit may be, for example, an output interface, a pin, or a circuit. The processing unit may execute a computer-executable instruction stored in a storage unit, to enable the RRC connection resume method in any one of the first aspect to be performed. Optionally, the storage unit may be a storage unit in a chip, such as a register or a cache. Alternatively, the storage unit may be a storage unit that is located outside a chip and that is in the terminal, for example, a read-only memory (ROM), other types of static storage devices capable of storing static information and instructions, or a random access memory (random access memory, RAM).

Any processor mentioned above may be a general-purpose central processing unit (CPU), a microprocessor, an application-specific integrated circuit (ASIC), or one or more integrated circuits for controlling program execution of the RRC connection resume method in any one of the first aspect.

In one embodiment, this application provides an apparatus. The apparatus may be a terminal, or may be a chip in a terminal. The apparatus has functions of implementing various embodiments of the second aspect. The function may be implemented by hardware, or may be implemented by hardware executing corresponding software. The hardware or the software includes one or more modules corresponding to the foregoing functions.

In one embodiment, when the apparatus is a terminal, the terminal includes a receiving unit, a sending unit, and a processing unit. The processing unit may be, for example, a processor, the receiving unit may be, for example, a receiver, and the sending unit may be, for example, a transmitter. The receiver and the transmitter include a radio frequency circuit. Optionally, the terminal further includes a storage unit, and the storage unit may be, for example, a memory. When the terminal includes the storage unit, the storage unit stores a computer-executable instruction. The processing unit is connected to the storage unit. The processing unit executes the computer-executable instruction stored in the storage unit, to enable the terminal to perform the RRC connection resume method in the second aspect.

In one embodiment, when the apparatus is a chip in a terminal, the chip includes a receiving unit, a sending unit, and a processing unit. The processing unit may be, for example, a processing circuit. The receiving unit may be, for example, an input interface, a pin, or a circuit. The sending unit may be, for example, an output interface, a pin, or a circuit. The processing unit may execute a computer-executable instruction stored in a storage unit, to enable the RRC connection resume method in any one of the second aspect to be performed. Optionally, the storage unit may be a storage unit in a chip, such as a register or a cache. Alternatively, the storage unit may be a storage unit that is located outside a chip and that is in the terminal, for example, a ROM, other types of static storage devices capable of storing static information and instructions, or a RAM.

Any processor mentioned above may be a general-purpose CPU, a microprocessor, an ASIC, or one or more integrated circuits for controlling program execution of the RRC connection resume method in the second aspect.

In one embodiment, this application provides an apparatus. The apparatus may be a base station, or may be a chip in a base station. The apparatus has functions of implementing various embodiments of the third aspect. The function may be implemented by hardware, or may be implemented by hardware executing corresponding software. The hardware or the software includes one or more modules corresponding to the foregoing functions.

In one embodiment, when the apparatus is a base station, the base station includes a receiving unit, a sending unit, and a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer-executable instruction. The processing unit is connected to the storage unit. The processing unit executes the computer-executable instruction stored in the storage unit, to enable the base station to perform the RRC connection resume method in any one of the third aspect.

In one embodiment, when the apparatus is a chip in a base station, the chip includes a receiving unit, a sending unit, and a processing unit. The processing unit may be, for example, a processing circuit. The receiving unit may be, for example, an input interface, a pin, or a circuit. The sending unit may be, for example, an output interface, a pin, or a circuit. The processing unit may execute a computer-executable instruction stored in a storage unit, to enable the RRC connection resume method in any one of the third aspect to be performed. Optionally, the storage unit may be a storage unit in a chip, such as a register or a cache. Alternatively, the storage unit may be a storage unit that is located outside a chip and that is in the terminal, for example, a ROM, other types of static storage devices capable of storing static information and instructions, or a RAM.

Any processor mentioned above may be a general-purpose CPU, a microprocessor, an ASIC, or one or more integrated circuits for controlling program execution of the RRC connection resume method in any one of the third aspect.

In one embodiment, this application provides an apparatus. The apparatus may be a base station, or may be a chip in a base station. The apparatus has functions of implementing various embodiments of the fourth aspect. The function may be implemented by hardware, or may be implemented by hardware executing corresponding software. The hardware or the software includes one or more modules corresponding to the foregoing functions.

In one embodiment, when the apparatus is a base station, the base station includes a receiving unit, a sending unit, and a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer-executable instruction. The processing unit is connected to the storage unit. The processing unit executes the computer-executable instruction stored in the storage unit, to enable the base station to perform the RRC connection resume method in the fourth aspect.

In one embodiment, when the apparatus is a chip in a base station, the chip includes a receiving unit, a sending unit, and a processing unit. The processing unit may be, for example, a processing circuit. The receiving unit may be, for example, an input interface, a pin, or a circuit. The sending unit may be, for example, an output interface, a pin, or a circuit. The processing unit may execute a computer-executable instruction stored in a storage unit, to enable the RRC connection resume method in the fourth aspect to be performed. Optionally, the storage unit may be a storage unit in a chip, such as a register or a cache. Alternatively, the storage unit may be a storage unit that is located outside a chip and that is in the base station, for example, a ROM, other types of static storage devices capable of storing static information and instructions, or a RAM.

Any processor mentioned above may be a general-purpose CPU, a microprocessor, an ASIC, or one or more integrated circuits for controlling program execution of the RRC connection resume method in the fourth aspect.

In one embodiment, this application further provides a computer readable storage medium. The computer readable storage medium stores an instruction. When the instruction is run on a computer, the computer is enabled to perform the methods according to the foregoing aspects.

In one embodiment, this application further provides a computer program product including an instruction. When the computer program product is run on a computer, the computer is enabled to perform the methods according to the foregoing aspects.

In addition, for technical effects brought by any design of the third to the tenth aspects, refer to technical effects brought by different designs of the first aspect or the second aspect. Details are not described herein.

In one embodiment, this application provides a communications system. The system includes the apparatus according to the fifth aspect and the apparatus according to the seventh aspect, or the system includes the apparatus according to the sixth aspect and the apparatus according to the eighth aspect.

These aspects or other aspects in this application may be clearer and more intelligible in descriptions in the following embodiments.

In this application, when the terminal moves to the target base station, the terminal sends the connection resume request message to the target base station, then the target base station reselects, based on a capability and a requirement of the target base station, the first encryption algorithm and the first integrity protection algorithm that are used when the target base station communicates with the terminal, and sends the first encryption algorithm and the first integrity protection algorithm to the terminal. Compared with the prior art, in this application, on one hand, a security algorithm used for communication between the terminal and the target base station is flexibly selected. On the other hand, because the base station connected to the terminal changes, communication security can be improved by using a new encryption algorithm and integrity protection algorithm.

DESCRIPTION OF EMBODIMENTS

The following further describes in detail this application with reference to accompanying drawings. A specific operation method in a method embodiment may also be applied to an apparatus embodiment or a system embodiment. In the descriptions of this application, unless otherwise stated, "a plurality of" means two or more than two.

It should be noted that a radio resource control (RRC) connection resume method in this application may be performed by an apparatus. The apparatus may include an apparatus on a network side and/or an apparatus on a terminal side. On the network side, the apparatus may be a base station or a chip in a base station. In other words, the RRC connection resume method in this application may be performed by the base station or the chip in the base station. On the terminal side, the apparatus may be a terminal or a chip in a terminal. In other words, the RRC connection resume method in this application may be performed by the terminal or the chip in the terminal.

For ease of description, in this application, that the apparatus is the base station or the terminal is used as an example to describe the RRC connection resume method. For an implementation method used when the apparatus is the chip in the base station or the chip in the terminal, refer to detailed descriptions of the RRC connection resume method of the base station or the terminal. Details are not repeatedly described again.

Figure 1:
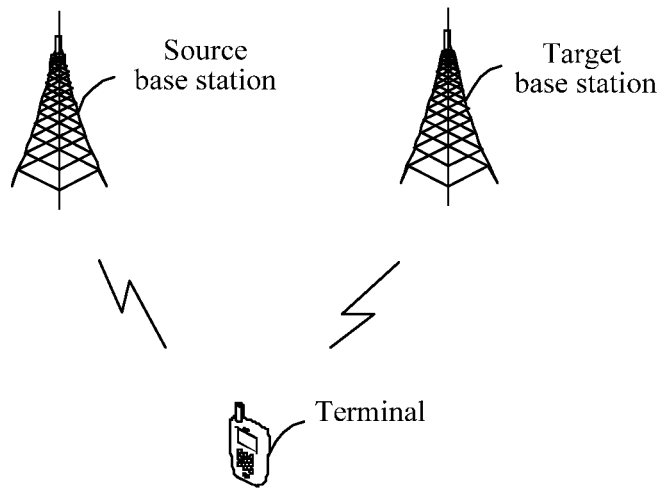
FIG. 1 is a schematic diagram of a possible network architecture according to one embodiment.

FIG. 1 is a schematic diagram of a possible network architecture according to one embodiment. The network architecture includes a terminal, a source base station, and a target base station. The terminal communicates with the source base station and target base station by using wireless interfaces. The source base station and the target base station may communicate with each other by using a wired connection, for example, by using an X2 interface or an Xn interface, or may communicate with each other by using an air interface.

In this embodiment, due to a cause such as movement of the terminal, the terminal may move from the source base station to the target base station. The source base station is a base station that the terminal accesses first, and the target base station is a base station that the terminal accesses later after moving.

The terminal is a device having a wireless transceiver function, and may be deployed on land, including indoor or outdoor, in a handheld manner, or in a vehicle-mounted manner, or may be deployed on water (such as on a ship) or in the air (such as on an airplane, a balloon, and a satellite). The terminal may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

The base station is a device that provides a wireless communication function for the terminal, and includes but is not limited to a next-generation base station (g nodeB, gNB) in 5G, an evolved NodeB (evolved node B, eNB), a radio network controller (radio network controller, RNC), a NodeB (node B, NB), a base station controller (BSC), a base transceiver station (base transceiver station, BTS), a home base station (for example, a home evolved nodeB, or a home node B, HNB), a baseband unit (BBU), a transmitting and receiving point (TRP), a transmitting point (TP), a mobile switching center, and the like.

In this embodiment, the terminal generally has three states: a connected state, an idle state, and an inactive state.

When the terminal is in the connected state, the terminal is in a normal working state. User data can be transmitted and received between a network side and the terminal.

When the terminal enters the idle state from the connected state, the terminal and the base station generally delete all access stratum (AS) contexts of the terminal. In a special case, in 4G, when the network side releases a connection to the terminal for a suspension cause, the terminal also enters the idle state from the connected state. However, in this case, the terminal and the base station delete some AS contexts, and reserve some AS contexts, for example, may reserve an access stratum key (which may be referred to as KeNB in 4G), a security capability of the terminal, and a security algorithm (including an integrity protection algorithm and an encryption algorithm) for communication between the terminal and a source base station accessed by the terminal. The security capability of the terminal refers to a security algorithm supported by the terminal, including a supported encryption algorithm and a supported integrity protection algorithm.

In 5G, the inactive state is introduced. When the terminal enters the inactive state from the connected state, the base station suspends the terminal. In this case, the terminal and the base station delete some AS contexts and reserve some AS contexts, for example, may reserve an access stratum key (which may be referred to as KgNB in 5G), and a security capability of the terminal, a security algorithm (including an integrity protection algorithm and an encryption algorithm) for communication between the terminal and a source base station accessed by the terminal. The security capability of the terminal refers to a security algorithm supported by the terminal, including a supported encryption algorithm and a supported integrity protection algorithm.

When the terminal is in the inactive state, because the terminal reserves some AS contexts, the terminal enters the connected state from the inactive state more quickly than entering the connected state from the idle state.

In addition, considering mobility of the terminal, when the terminal restores from the inactive state to the connected state, the terminal may need to change the base station. In other words, the terminal first establishes a connection to the source base station, and then the terminal enters the inactive state in the source base station due to some causes, for example, a notification from the network side. When the terminal expects to restore to the connected state, if the terminal already moves to coverage of a target base station, the terminal restores from the inactive state to the connected state in the target base station.

Certainly, this application is also applicable to a scenario in which when the terminal restores from the inactive state to the connected state, the target base station and the source base station that are accessed by the terminal are the same. In other words, the base station accessed by the terminal may not change, and is still a same base station.

It is mainly discussed in this embodiment how to adapt to some requirements of the target base station when the terminal determines that the terminal needs to enter the connected state from the inactive state, in other words, resume a connection to the target base station, to achieve a flexible and secure connection.

Before a specific RRC connection resume method in this embodiment is described, a process in which the terminal enters the inactive state from the connected state is first described.

Figure 2:
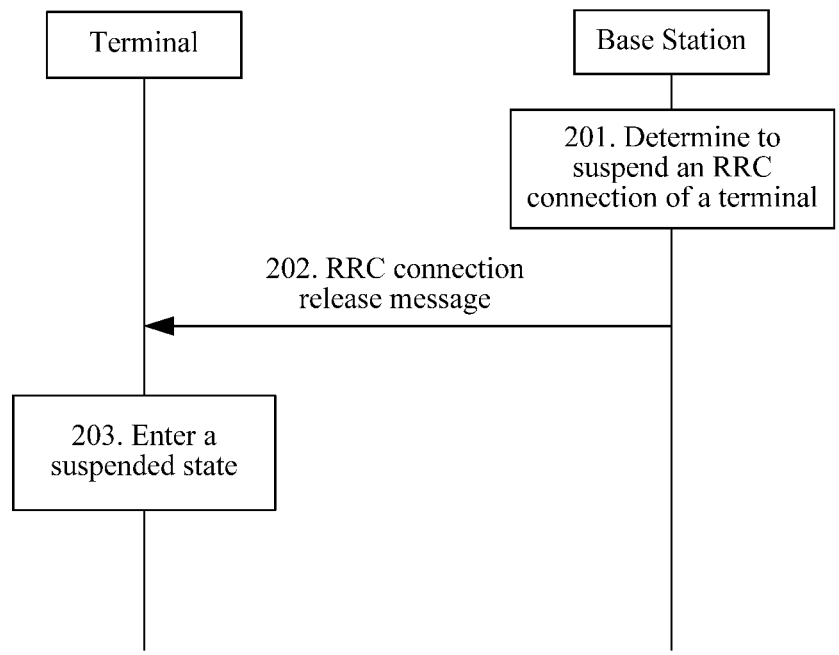
FIG. 2 is a schematic diagram of a process in which a terminal enters an inactive state from a connected state according to one embodiment.

FIG. 2 is a schematic diagram of a process in which a terminal enters an inactive state from a connected state according to one embodiment. The process includes the following operations.

Operation 201. A base station determines to suspend an RRC connection to a terminal.

For example, when the base station does not receive, within a period of time, data sent by the terminal, the base station determines to suspend the terminal.

Operation 202. The base station sends a suspension message to the terminal.

The suspension message is used to instruct the terminal to release the RRC connection and enter an inactive state. The suspension message may be, for example, an RRC connection release message including a special indication.

In a specific implementation, the suspension message may carry the following parameters: a resume identifier, a next hop chaining counter (NCC), and the like.

The resume identifier is a parameter needed when the terminal subsequently enters a connected state from the inactive state, and the resume identifier may include information such as an identifier of a source base station and an identifier of the terminal.

The NCC is also a parameter needed when the terminal subsequently enters the connected state from the inactive state. The NCC is a parameter needed when a new access stratum key is generated. In other words, the NCC may be used to generate a new access stratum key (in this application, KgNB* is used to represent the new access stratum key).

In one embodiment, the suspension message may further carry a cause parameter releaseCause, and releaseCause is used to instruct the terminal to perform a suspension operation and enter the inactive state. For example, releaseCause may be set to "RRC Suspend" or "RRC Inactive". When obtaining the releaseCause parameter, the terminal determines that a value of releaseCause is "RRC Suspend" or "RRC Inactive", and performs an operation related to suspension of the terminal.

In one embodiment, the base station may further instruct a control plane network element in a core network to release a bearer, for example, release a signaling radio bearer (SRB) and a data radio bearer (DRB).

Operation 203. The terminal enters the inactive state.

The terminal deletes some AS contexts and reserves some AS contexts. The reserved some AS contexts include an access stratum key, a security capability of the terminal, an integrity protection algorithm and an encryption algorithm that are used for communication between the terminal and the source base station accessed by the terminal, and the like.

The terminal further stores parameters such as the resume identifier and the NCC that are sent by the base station.

The terminal suspends a bearer, for example, suspends a signaling radio bearer and a data radio bearer, and then enters the inactive state.

It can be learned from the foregoing process in which the terminal enters the inactive state from the connected state that, after entering the inactive state, the terminal stores some AS contexts and parameters received from the base station. Therefore, when the terminal subsequently expects to restore from the inactive state to the connected state, these parameters help the terminal quickly restore from the inactive state to the connected state.

The following describes an RRC connection resume method in this application, that is, the terminal restoring from the inactive state to the connected state. In addition, the terminal restores from the inactive state to the connected state within coverage of a target base station.

The target base station and the source base station may be different base stations, or may be a same base station. The following describes the RRC connection resume method in this application by using an example in which the target base station and the source base station are different base stations. When the target base station and the source base station are a same base station, only an interaction operation between the source base station and the target base station needs to be omitted.

When communicating with the base station, the terminal needs to perform encryption and integrity protection on a communication message. For example, an encryption algorithm is used to encrypt the message, and an integrity protection algorithm is used to perform integrity protection on the message.

In this embodiment, when the terminal resumes the connection to the target base station, the terminal and the target base station protect the communication message by using a new negotiated encryption algorithm and integrity protection algorithm.

In other words, in this application, when the terminal moves to the target base station, the target base station may reselect an encryption algorithm and an integrity protection algorithm based on a capability and a requirement of the target base station, and communicate with the terminal by using the reselected encryption algorithm and integrity protection algorithm, rather than continue to use the encryption algorithm and the integrity protection algorithm that are used for communication between the terminal and the source base station. Therefore, according to the method in this application, on one hand, the target base station may reselect the encryption algorithm and the integrity protection algorithm, which is relatively flexible. On the other hand, because the new encryption algorithm and integrity protection algorithm are used, communication security can be improved.

For ease of description, in this embodiment, security algorithms that are used for communication and that are negotiated by the terminal and the target base station are referred to as a first encryption algorithm and a first integrity protection algorithm. In other words, the first encryption algorithm is an encryption algorithm that is used for secure communication and that is negotiated by the terminal and the target base station, and the first integrity protection algorithm is an integrity protection algorithm that is used for secure communication and that is negotiated by the terminal and the target base station. Security algorithms used for communication between the terminal and the source base station are referred to as a second encryption algorithm and a second integrity protection algorithm. In other words, the second encryption algorithm is an encryption algorithm that is used for secure communication and that is negotiated by the terminal and the source base station, and the second integrity protection algorithm is an integrity protection algorithm that is used for secure communication and that is negotiated by the terminal and the source base station.

It should be noted that the first encryption algorithm and the second encryption algorithm that are reselected by the target base station may be the same or may be different. Similarly, the first integrity protection algorithm and the second integrity protection algorithm that are reselected by the target base station may be the same or may be different.

Figure 3:
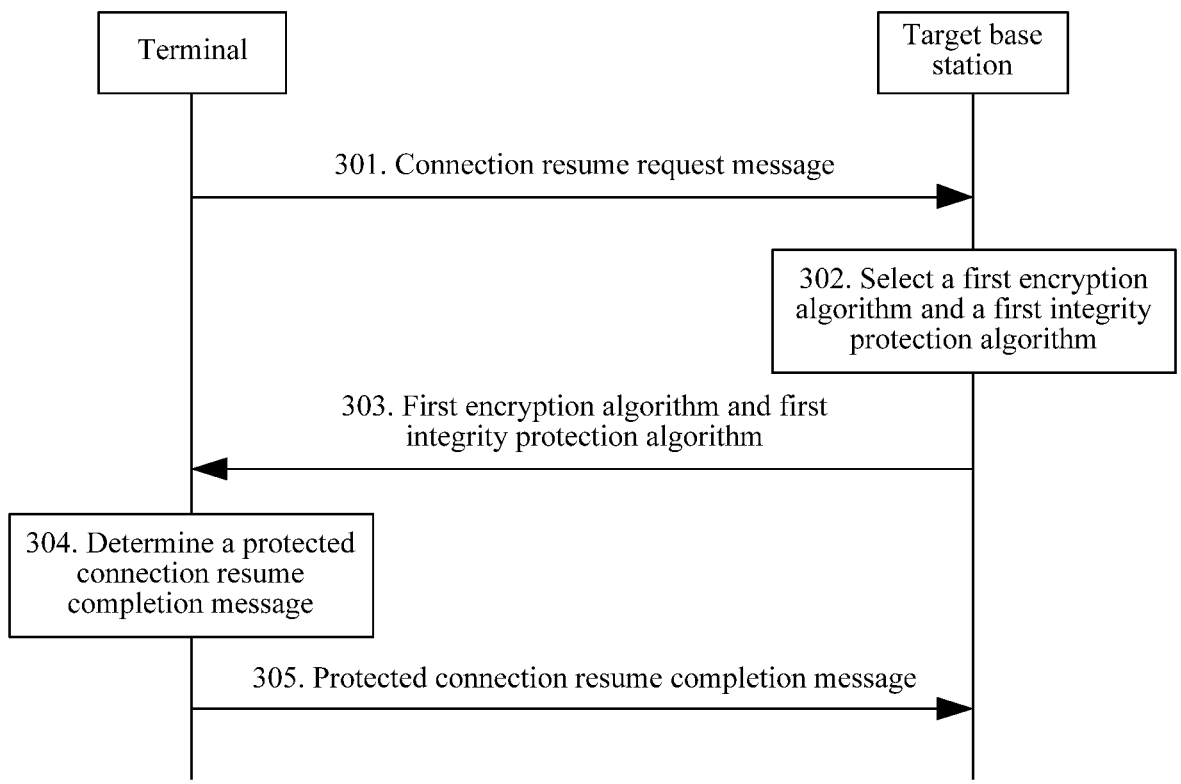
FIG. 3 is a schematic diagram of an RRC connection resume method according to one embodiment.

FIG. 3 shows an RRC connection resume method according to one embodiment. The method includes the following operations.

Operation 301. A terminal sends a connection resume request message to a target base station.

Correspondingly, the target base station receives the connection resume request message from the terminal.

The connection resume request message sent by the terminal is used to request to resume an RRC connection. In other words, the terminal requests to restore from an inactive state to a connected state.

In one embodiment, the connection resume request message carries a resume identifier.

Further, the connection resume request message may further carry a short message authentication code for integrity (shortMAC-I). The shortMAC-I is used to authenticate the terminal.

Operation 302. The target base station selects a first encryption algorithm and a first integrity protection algorithm.

In one embodiment, after receiving the connection resume request message, the target base station obtains the resume identifier from the connection resume request message, and if determining, based on an identifier of a source base station in the resume identifier, that the terminal is previously connected to the source base station, sends a context request message to the source base station. The context request message is used to request to obtain a context of the terminal. For example, the context request message carries the resume identifier. Optionally, if the connection resume request message further carries the shortMAC-I, the shortMAC-I is further carried in the context request message and sent to the source base station.

After receiving the context request message sent by the target base station, the source base station obtains the resume identifier from the context request message, and obtains an access stratum context of the terminal based on an identifier of the terminal in the resume identifier. The access stratum context includes a security capability of the terminal. Optionally, the obtained access stratum context of the terminal further includes information such as a second encryption algorithm and a second integrity protection algorithm that are negotiated between the terminal and the source base station.

The source base station adds the obtained security capability of the terminal to a context response message, and sends the context response message to the target base station. Optionally, the context response message further includes the second encryption algorithm and the second integrity protection algorithm that are used for communication between the terminal and the source base station.

In one embodiment, the source base station further regenerates an access stratum key, adds the regenerated access stratum key (KgNB*) to the context response message, and sends the context response message to the target base station.

In one embodiment, if the source base station further receives the shortMAC-I sent by the target base station, the source base station further checks the received shortMAC-I. The obtained access stratum context of the terminal is sent to the target base station only when check on the shortMAC-I succeeds, that is, when it is determined that the terminal is an authorized terminal.

Operation 303. The target base station sends the first encryption algorithm and the first integrity protection algorithm to the terminal.

Correspondingly, the terminal receives the first encryption algorithm and the first integrity protection algorithm from the target base station.

When the terminal receives the first encryption algorithm and the first integrity protection algorithm that are from the target base station, the terminal may obtain the first encryption algorithm and the first integrity protection algorithm.

Operation 304. The terminal obtains a protected connection resume completion message based on the first encryption algorithm, the first integrity protection algorithm, and a connection resume completion message.

Specifically, after the terminal restores to an RRC connected state, the terminal sends the connection resume completion message to the target base station. The connection resume completion message is used to indicate that the RRC connection has been resumed. In other words, the terminal notifies the target base station that the terminal already enters the RRC connected state.

After generating the connection resume completion message and before sending the connection resume completion message, the terminal may further perform security protection on the connection resume completion message. Specifically, the terminal obtains the protected connection resume completion message based on the first encryption algorithm, the first integrity protection algorithm, and the connection resume completion message.

In one embodiment, the terminal may first encrypt the connection resume completion message based on the first encryption algorithm and a first encryption key, to obtain an encrypted connection resume completion message. Then, the terminal performs integrity protection on the encrypted connection resume completion message based on the first integrity protection algorithm and a first integrity protection key, to obtain the protected connection resume completion message.

In one embodiment, the terminal may first perform integrity protection on the connection resume completion message based on the first integrity protection algorithm and a first integrity protection key, to obtain a connection resume completion message on which integrity protection has been performed. Then, the terminal encrypts, based on the first encryption algorithm and a first encryption key, the connection resume completion message on which integrity protection has been performed, to obtain the protected connection resume completion message.

The first encryption key is generated by the terminal based on the first encryption algorithm. In a specific implementation, the first encryption key may be generated by the terminal based on an access stratum key, an identifier of the first encryption algorithm, and a type of the first encryption algorithm. The first integrity protection key is generated by the terminal based on the first integrity protection algorithm. In a specific implementation, the first integrity protection key may be generated by the terminal based on the access stratum key, an identifier of the first integrity protection algorithm, and a type of the first integrity protection algorithm.

A method for obtaining the protected connection resume completion message is not specifically limited in this application, and may be flexibly selected according to a requirement in actual applications.

Operation 305. The terminal sends the protected connection resume completion message to the target base station.

Correspondingly, the target base station receives the protected connection resume completion message from the terminal.

After receiving the protected connection resume completion message, the target base station obtains the connection resume completion message based on the protected connection resume completion message, the first encryption algorithm, and the first integrity protection algorithm, and determines, based on the connection resume completion message, that the terminal enters the RRC connected state.

It should be noted that a method for obtaining, by the target base station, the connection resume completion message based on the protected connection resume completion message, the first encryption algorithm, and the first integrity protection algorithm corresponds to a method for protecting, by the terminal, the connection resume completion message.

For example, if the terminal first encrypts the connection resume completion message and then performs integrity protection, the method for obtaining, by the target base station, the connection resume completion message is: performing, by the target base station, integrity check on the protected connection resume completion message based on the first integrity protection algorithm and the first integrity protection key. When the check succeeds, further, the target base station decrypts, based on the first encryption algorithm and the first encryption key, the connection resume completion message on which integrity check has been performed, to obtain the connection resume completion message.

As another example, if the terminal first performs integrity protection on the connection resume completion message, and then encrypts the connection resume completion message, the method for obtaining, by the target base station, the connection resume completion message is: decrypting, by the target base station, the protected connection resume completion message based on the first encryption algorithm and the first encryption key, to obtain the decrypted connection resume completion message. Further, the target base station performs integrity check on the decrypted connection resume completion message based on the first integrity protection algorithm and the first integrity protection key. If the check succeeds, the connection resume completion message is obtained.

In this embodiment, according to operation 301 to operation 305, when the terminal moves to the target base station, the target base station may reselect, based on a capability and a requirement of the target base station, the first encryption algorithm and the first integrity protection algorithm that are used when the target base station communicates with the terminal, and send the first encryption algorithm and the first integrity protection algorithm to the terminal. On one hand, a security algorithm used for communication between the terminal and the target base station is flexibly selected. On the other hand, because the base station connected to the terminal changes, communication security can be improved by using a new encryption algorithm and integrity protection algorithm.

The following describes specific implementation methods of some implementation processes used in operation 301 to operation 305.

For the foregoing operation 301, when the connection resume request message includes the shortMAC-I, in an implementation, the terminal may generate the shortMAC-I according to the following operations.

Operation A1. The terminal obtains a first NCC and a second NCC.

The first NCC is an NCC that is sent by the source base station to the terminal in a suspension procedure and that is stored by the terminal. For details, refer to operation 202.

The second NCC is an NCC stored before the terminal obtains the first NCC.

Operation A2. The terminal determines whether the first NCC is the same as the second NCC. If the first NCC is the same as the second NCC, operation A3 is performed; otherwise, operation A4 is performed.

Operation A3. The terminal obtains KgNB* based on KgNB.

KgNB refers to an old access stratum key (old KgNB), may also be referred to as an original access stratum key (original KgNB).

Correspondingly, KgNB* refers to a new access stratum key (new KgNB), and may also be referred to as an updated access stratum key (updated KgNB).

It should be noted that KgNB and KgNB* are merely symbolic representations. For example, in a 4G application, the access stratum key may be represented by KeNB or KeNB*. Different representation forms of a symbol do not constitute a limitation to this application.

In one embodiment, the terminal may obtain KgNB* based on KgNB, a source physical cell identifier (PCI), and an absolute radio frequency channel number-downlink (ARFCN-DL).

For a specific implementation of obtaining KgNB* based on KgNB, the source PCI, and the ARFCN-DL, which is the prior art, refer to related documents. For example, refer to related descriptions in 3rd generation partnership project (3GPP) technical specification (TS) 33.401 or 3GPP TS 33.501. Details are not described herein.

Operation A4 is performed after operation A3.

Operation A4. The terminal obtains a next hop (NH) based on the first NCC and the second NCC, and obtains KgNB* based on the NH.

The NH has a correspondence with the first NCC and the second NCC. The terminal may determine, based on the first NCC and the second NCC, a quantity N of times of derivation that is based on the NH, obtain a next NH through derivation based on the current NH, and obtain another NH through derivation by using the next NH. This process is repeated until derivation is performed for N times, to obtain a final NH.

In one embodiment the terminal may obtain KgNB* based on the NH, the source PCI, and the ARFCN-DL.

For a specific implementation of obtaining KgNB* based on the NH, the source PCI, and the ARFCN-DL, which is the prior art, refer to related documents. For example, refer to related descriptions in 3GPP TS 33.401 or 3GPP TS 33.501. Details are not described herein.

Operation A5 is performed after operation A4.

Operation A5. The terminal obtains a second integrity protection key Krrc-int* through derivation based on KgNB*, an identifier of the second integrity protection algorithm, and a type of the second integrity protection algorithm.

In this embodiment, the type of the second integrity protection algorithm is an RRC integrity protection algorithm.

Operation A6. Obtain the shortMAC-I based on Krrc-int* and the second integrity protection algorithm.

In one embodiment, the shortMAC-I may be obtained based on Krrc-int*, the second integrity protection algorithm, a source cell radio network temporary identifier (C-RNTI), the source PCI, and an identifier of a target cell.

According to the foregoing operation A1 to operation A6, the terminal may generate the shortMAC-I.

Correspondingly, if the connection resume request message includes the shortMAC-I, the target base station also adds the shortMAC-I to the context request message and sends the context request message to the source base station, and the source base station checks the context request message with the terminal. An access stratum context of the terminal is sent to the target base station only when the check succeeds.

Correspondingly, a method used by the source base station to check the shortMAC-I may include the following operations.

Operation B1. The source base station determines whether the next hop NH is already used; if the next hop NH is not used, perform operation B2; if the next hop NH is already used, perform operation B3.

Operation B2. The source base station obtains KgNB* based on the NH.

A specific process of operation B2 is the same as that of operation A4 in the foregoing method for generating, by the terminal, the shortMAC-I. Refer to the foregoing descriptions.

Operation B3 is performed after operation B2.

Operation B3. The source base station obtains KgNB* based on KgNB.

A specific process of operation B3 is the same as that of operation A3 in the foregoing method for generating, by the terminal, the shortMAC-I. Refer to the foregoing descriptions.

Operation B4 is performed after operation B3.

Operation B4. The source base station obtains the second integrity protection key Krrc-int* through derivation based on KgNB*, the identifier of the second integrity protection algorithm, and the type of the second integrity protection algorithm.

In this embodiment, the type of the second integrity protection algorithm is an RRC integrity protection algorithm.

Operation B5. Check, based on Krrc-int* and the second integrity protection algorithm, the shortMAC-I received from the terminal.

In one embodiment, the shortMAC-I received from the terminal may be checked based on Krrc-int*, the second integrity protection algorithm, the source C-RNTI, the source PCI, and the identifier of the target cell.

According to the foregoing operation B1 to operation B5, the source base station may check the shortMAC-I received from the terminal.

For operation 302 in the procedure shown in FIG. 3, in one embodiment, a specific method for selecting, by the target base station, the first encryption algorithm and the first integrity protection algorithm may be, for example, selecting, by the target base station from the security capability of the terminal based on an encryption algorithm priority list of the target base station, an encryption algorithm with a highest priority as the selected first encryption algorithm. Alternatively, the method may be selecting K encryption algorithms with highest priorities from the security capability of the terminal, where K is greater than 1, and then randomly selecting an encryption algorithm from the selected K encryption algorithms as the selected first encryption algorithm. Alternatively, the first encryption algorithm may be selected in another manner. The selected first encryption algorithm is used as an encryption algorithm that is used for communication and that is negotiated by the terminal and the target base station.

Similarly, the target base station may select the first integrity protection algorithm from the security capability of the terminal in a manner the same as that of selecting the first encryption algorithm. The selected first integrity protection algorithm is used as an integrity protection algorithm that is used for communication and that is negotiated by the terminal and the target base station.

For the foregoing operation 303, a method for receiving and obtaining, by the terminal, the first encryption algorithm and the first integrity protection algorithm that are from the target base station may be implemented by using at least the following methods, but not limited to the following methods.

First implementation method: The target base station sends a connection resume response message to the terminal, where the connection resume response message is encrypted based on the second encryption algorithm and the second encryption key, and the connection resume response message includes the first encryption algorithm and the first integrity protection algorithm.

The connection resume response message is a response message for the connection resume request message sent by the terminal in operation 301, and the connection resume response message is used to instruct the terminal to resume the RRC connection. When receiving the connection resume response message, the terminal starts to resume the RRC connection.

Therefore, in the first implementation method, the first encryption algorithm and the first integrity protection algorithm that are reselected by the target base station are carried in the connection resume response message as parameters, and sent to the terminal.

Generally, to improve communication security, security protection needs to be performed on the connection resume response message sent by the target base station to the terminal. To be specific, the connection resume response message may be encrypted by using an encryption algorithm, and integrity protection on the connection resume response message may be performed by using an integrity protection algorithm.

In the first implementation method, the connection resume response message may be encrypted in the following manner: First, the second encryption key is generated based on the second encryption algorithm described above, and then the connection resume response message is encrypted based on the second encryption algorithm and the second encryption key, to obtain the encrypted connection resume response message.

For example, an implementation in which the target base station generates the second encryption key may be obtaining, by the target base station, a second encryption key Krrc-enc* through derivation based on KgNB*, an identifier of the second encryption algorithm, and a type of the second encryption algorithm. KgNB*, the identifier of the second encryption algorithm, and the type of the second encryption algorithm are all sent by the source base station to the target base station. Optionally, the source base station adds KgNB*, the identifier of the second encryption algorithm, and the type of the second encryption algorithm to the context response message, and sends the context response message to the target base station.

Further, integrity protection may be further performed on the encrypted connection resume response message. In a specific implementation process, integrity protection may be performed on the encrypted connection resume response message in the following manner: First, the second integrity protection key is generated based on the second integrity protection algorithm described above, and then integrity protection is performed on the encrypted connection resume response message based on the second integrity protection algorithm and the second integrity protection key, to obtain a protected connection resume response message.

For example, an implementation in which the target base station generates the second integrity protection key may be obtaining, by the target base station, the second integrity protection key Krrc-int* through derivation based on KgNB*, the identifier of the second integrity protection algorithm, and the type of the second integrity protection algorithm. KgNB*, the identifier of the second integrity protection algorithm, and the type of the second integrity protection algorithm are all sent by the source base station to the target base station. Optionally, the source base station adds KgNB*, the identifier of the second integrity protection algorithm, and the type of the second integrity protection algorithm to the context response message, and sends the context response message to the target base station.

In other words, in the first implementation method, the connection resume response message sent by the target base station to the terminal is a connection resume response message on which encryption and integrity protection have been performed. Therefore, that the target base station sends the connection resume response message to the terminal may also be expressed as: The base station sends the protected connection resume response message to the terminal.

It should be noted that, in one embodiment, for the protected connection resume response message, integrity protection may be first performed on the connection resume response message, to obtain a connection resume response message on which integrity protection has been performed, and then, the connection resume response message on which integrity protection has been performed is encrypted, to obtain the protected connection resume response message. For a specific implementation, refer to the foregoing descriptions. Details are not described again.

In conclusion, in the first implementation method, the first encryption algorithm and the first integrity protection algorithm are carried in the protected connection resume response message, and sent to the terminal. The protected connection resume response message is encrypted based on the second encryption algorithm and the second encryption key, and integrity protection is performed on the protected connection resume response message based on the second integrity protection algorithm and the second integrity protection key.

Therefore, after receiving the protected connection resume response message, the terminal performs decryption and integrity check on the protected connection resume response message, to obtain the connection resume response message.

Specifically, if the target base station first encrypts the connection resume response message, and then performs integrity protection on the connection resume response message, correspondingly, the terminal first performs integrity check on the protected connection resume response message, and then decrypts the connection resume response message on which integrity check has been performed, to obtain the connection resume response message.

If the target base station first performs integrity protection the connection resume response message, and then encrypts the connection resume response message, correspondingly, the terminal first decrypts the protected connection resume response message, and then performs integrity check on the decrypted connection resume response message, to obtain the connection resume response message.

A method for decrypting, by the terminal, the protected connection resume response message or the connection resume response message on which integrity check has been performed and a method for encrypting, by the target base station, the connection resume response message are corresponding operations. To be specific, the terminal generates the second encryption key based on the second encryption algorithm, and decrypts, based on the second encryption key and the second encryption algorithm, the protected connection resume response message or the connection resume response message on which integrity check has been performed. For specific implementation details, refer to the descriptions of the foregoing encryption process. Details are not described herein again.

In addition, a method for performing, by the terminal, integrity check on the protected connection resume response message or the decrypted connection resume response message and a method for performing, by the target base station, integrity protection on the connection resume response message are corresponding operations. To be specific, the terminal generates the second integrity protection key based on the second integrity protection algorithm, and performs integrity check on the protected connection resume response message or the decrypted connection resume response message based on the second integrity protection key and the second integrity protection algorithm. For specific implementation details, refer to the descriptions of the foregoing encryption process. Details are not described herein again.

Further, after obtaining the connection resume response message, the terminal may obtain the carried first encryption algorithm and first integrity protection algorithm from the connection resume response message.

It should be noted that, in the foregoing first implementation method, the second encryption key used when the terminal decrypts the connection resume response message and the second integrity protection key used when the terminal performs integrity check on the connection resume response message may be temporarily generated or may be locally obtained. For example, when generating the short-MAC-I, the terminal already generates the second encryption key Krrc-enc* and the second integrity protection key Krrc-int*. Therefore, when decrypting the connection resume response message, the terminal may directly use the second encryption key Krrc-enc* that is already generated previously. In addition, when performing integrity check on the connection resume response message, the terminal may directly use the second integrity protection key KRrrc-int* that is already generated previously. In this implementation method, overheads of the terminal can be reduced.

In the first implementation method, the connection resume response message is encrypted by using the second encryption algorithm and the second encryption key. Therefore, the first encryption algorithm may be carried in the protected connection resume response message.

If the connection resume response message is encrypted by using the first encryption algorithm and the first encryption key, the first encryption algorithm cannot be carried in the protected connection resume response message. This is because in this case, the terminal needs to use the first encryption algorithm and the first encryption key to decrypt the protected connection resume response message, but the first encryption algorithm is carried in the protected connection resume response message. The first encryption key is generated at least based on the first encryption algorithm.

Therefore, if a method for encrypting the connection resume response message based on the first encryption algorithm and the first encryption key is used, the method may be implemented by using the following second implementation method or third implementation method.

Second implementation method: The target base station sends the connection resume response message and the first encryption algorithm to the terminal, where the connection resume response message is encrypted based on the first encryption algorithm and the first encryption key, and the connection resume response message includes the first integrity protection algorithm.

A main difference between the second implementation method and the first implementation method lies in: In the second implementation method, the connection resume response message is encrypted based on the first encryption algorithm and the first encryption key, the connection resume response message includes the first integrity protection algorithm, but does not include the first encryption algorithm, and the first encryption algorithm and the connection resume response message are sent to the terminal together, or the first encryption algorithm and the connection resume response message are separately sent to the terminal.

For a specific implementation process of encrypting the connection resume response message based on the first encryption algorithm and the first encryption key, refer to the foregoing specific implementation process of encrypting the connection resume response message based on the second encryption algorithm and the second encryption key. Details are not described herein again.

Further, integrity protection may be further performed on the connection resume response message based on the first integrity protection algorithm and the first integrity protection key. For a specific implementation process thereof, refer to the foregoing specific implementation process of encrypting the connection resume response message based on the second integrity protection algorithm and the second integrity protection key. Details are not described herein again.

Correspondingly, after receiving the connection resume response message and the first encryption algorithm that are sent by the target base station, the terminal first generates the first encryption key based on the first encryption algorithm, and then decrypts the connection resume response message based on the first encryption key and the first encryption algorithm. This may also be expressed as decrypting the protected connection resume response message. A specific implementation process thereof is the same as that in the first implementation method. A process in which the terminal decrypts the protected connection resume response message is similar. Refer to the foregoing descriptions.

Further, after the protected connection resume response message is decrypted, the first integrity protection algorithm may be obtained from the protected connection resume response message, then, the first integrity protection key is generated based on the first integrity protection algorithm, and integrity check is performed on the decrypted connection resume response message based on the first integrity protection algorithm and the first integrity protection key. When the check succeeds, it may be determined that the RRC connection may start to be resumed.

In the foregoing second implementation method, because the terminal can obtain the first integrity protection algorithm only after obtaining the first encryption algorithm, the terminal needs to first decrypt the protected connection resume response message, and then performs integrity check on the decrypted connection resume response message. Therefore, the target base station first performs integrity protection on the connection resume response message, and then encrypts the connection resume response message.

Third implementation method: The target base station sends the connection resume response message, the first encryption algorithm, and the first integrity protection algorithm to the terminal, where the connection resume response message is encrypted based on the first encryption algorithm and the first encryption key.

A main difference between the third implementation method and the second implementation method lies in: In the third implementation method, neither the first encryption algorithm nor the first integrity protection algorithm is carried in the connection resume response message, but are sent to the terminal together with the connection resume response message, or are separately sent to the terminal.

In other words, in the third implementation method, parameters that need to be sent to the terminal, that is, the first encryption algorithm and the first integrity protection algorithm, are sent to the terminal as a whole. However, because the first encryption algorithm cannot be carried in the connection resume response message, neither the first encryption algorithm nor the first integrity protection algorithm is carried in the connection resume response message.

In the third implementation method, a specific implementation process in which the target base station encrypts the connection resume response message and performs integrity protection on the connection resume response message is similar to the implementation process in which the connection resume response message is encrypted, and integrity protection is performed on the connection resume response message in the first implementation method. Refer to the foregoing descriptions. Details are not described herein again.

It should be noted that in the third implementation method, the target base station may first encrypt the connection resume response message, and then perform integrity protection on the encrypted connection resume response message. Alternatively, the target base station may first perform integrity protection on the connection resume response message, and then encrypt the connection resume response message on which integrity protection has been performed.

Correspondingly, the terminal first performs integrity check on the connection resume response message, and then decrypts the connection resume response message on which integrity check has been performed. Alternatively, the terminal first decrypts the connection resume response message, and then performs integrity check on the decrypted connection resume response message.

It should be noted that the first implementation method to third implementation method are merely examples. In an actual application, there may be another implementation method. For example, there may be the following implementation methods.

Fourth implementation method: The target base station sends the connection resume response message, the first encryption algorithm, and the first integrity protection algorithm to the terminal, where the connection resume response message is encrypted based on the second encryption algorithm and the second encryption key.

In other words, the connection resume response message is encrypted based on the second encryption algorithm and the second encryption key. In addition, it is not the case that both the first encryption algorithm and the first integrity protection algorithm are carried in the connection resume response message, and sent to the terminal, but the first encryption algorithm and the first integrity protection algorithm are separately sent to the terminal.

Fifth implementation method: The target base station sends the connection resume response message and the first integrity protection algorithm to the terminal, where the connection resume response message is encrypted based on the second encryption algorithm and the second encryption key, and the connection resume response message includes the first encryption algorithm.

In other words, the connection resume response message is encrypted based on the second encryption algorithm and the second encryption key. In addition, the first encryption algorithm is carried in the connection resume response message, and sent to the terminal, while the first integrity protection algorithm is separately sent to the terminal.

Sixth implementation method: The target base station sends the connection resume response message and the first encryption algorithm to the terminal, where the connection resume response message is encrypted based on the second encryption algorithm and the second encryption key, and the connection resume response message includes the first integrity protection algorithm.

In other words, the connection resume response message is encrypted based on the second encryption algorithm and the second encryption key. In addition, the first integrity protection algorithm is carried in the connection resume response message, and sent to the terminal, while the first encryption algorithm is separately sent to the terminal.

Seventh implementation method: The target base station sends a first message to the terminal, where the first terminal includes the first encryption algorithm and the first integrity protection algorithm. Correspondingly, the terminal receives the first message from the target base station.

In the seventh implementation method, the first encryption algorithm and the first integrity protection algorithm that are reselected by the target base station are carried in the first message as parameters, and are sent to the terminal. In an implementation, the first message may be a security mode command message. In another implementation, the first message may be an RRC reconfiguration message.

Generally, to improve communication security, security protection needs to be performed on the first message sent by the target base station to the terminal. For example, integrity protection may be performed on the connection resume response message by using an integrity protection algorithm.

In the seventh implementation method, integrity protection may be performed on the first message in the following manner: First, the first integrity protection key is generated based on the first integrity protection algorithm, and then integrity protection is performed on the first message based on the first integrity protection algorithm and the first integrity protection key, to obtain the protected first message.

In an implementation, the target base station may generate the first integrity protection key based on the first integrity protection algorithm and a current access stratum key. The current access stratum key (that is, KgNB*) is generated by the source base station according to the foregoing operation B2 or operation B3 and then sent to the target base station. Optionally, the source base station adds KgNB* to the context response message, and sends the context response message to the target base station.

For example, an implementation in which the target base station generates the first integrity protection key may be obtaining, by the target base station, the first integrity protection key Krrc-int* through derivation based on KgNB*, the identifier of the first integrity protection algorithm, and the type of the first integrity protection algorithm.

In other words, in the seventh implementation method, the first message sent by the target base station to the terminal may be a first message on which integrity protection has been performed. Therefore, when the first message is protected, that the target base station sends the first message to the terminal may also be expressed as: The base station sends the protected first message to the terminal.

In conclusion, in the seventh implementation, the first encryption algorithm and the first integrity protection algorithm are carried in the first message, and the first message is sent to the terminal. Integrity protection may be performed on the first message based on the first integrity protection algorithm and the first integrity protection key.

Therefore, after receiving the protected first message, the terminal may obtain the first integrity protection algorithm and the first encryption algorithm from the first message. Further, integrity check is further performed on the protected first message.

A method for performing, by the terminal, integrity check on the protected first message and a method for performing, by the target base station, integrity protection on the first message are corresponding operations. To be specific, the terminal generates the first integrity protection key based on the first integrity protection algorithm, and performs integrity check on the protected first message based on the first integrity protection key and the first integrity protection algorithm.

Specifically, the terminal may generate the first integrity protection key based on the first integrity protection algorithm and the current access stratum key. The current access stratum key (that is, KgNB*) is generated by the terminal according to the foregoing operation A3 or operation A4.

For example, corresponding to the method for generating, by the target base station, the first integrity protection key, an implementation in which the terminal generates the first integrity protection key may be obtaining, by the terminal, the first integrity protection key Krrc-int* through derivation based on KgNB*, the identifier of the first integrity protection algorithm, and the type of the first integrity protection algorithm.

It should be noted that when the first message is a security mode command message or an RRC reconfiguration message, after receiving the security mode command message or the RRC reconfiguration message, the terminal is triggered to update the access stratum key. Therefore, if the terminal already updates the access stratum key before receiving the first message, the target base station further needs to notify the terminal that the access stratum key does not need to be updated. For example, if the terminal further generates the shortMAC-I before operation 301, the terminal already updates the access stratum key from KgNB to KgNB* in a process of generating the shortMAC-I. Therefore, after receiving the first message, the terminal does not need to update the access stratum key.

Specifically, the terminal may be notified, by using the following methods but not limited to the following methods, that the access stratum key does not need to be updated.

Method A: The first message carries the first encryption algorithm, the first integrity protection algorithm, and first instruction information, and the first instruction information is used to instruct the terminal not to update the access stratum key.

In other words, after receiving the first message, the terminal obtains the first encryption algorithm, the first integrity protection algorithm, and the first instruction information from the first message.

The terminal may determine, according to the first instruction information, that the access stratum key does not need to be updated. Therefore, when the terminal generates the first integrity protection key based on the first integrity protection algorithm and the current access stratum key, the used current access stratum key is KgNB* (KgNB* is the current key) obtained by the terminal through update in a process of generating the shortMAC-I, and KgNB* does not need to be further updated.

Method B: The first message carries the first encryption algorithm and the first integrity protection algorithm.

In the method, after receiving the first message, if the terminal determines that the first message does not carry second instruction information, the terminal determines that the access stratum key does not need to be updated. The second instruction information is used to instruct the terminal to update the access stratum key.

It may also be understood that when the first message carries the second instruction information, the terminal determines, according to the second instruction information, that the access stratum key needs to be updated. Therefore, KgNB* needs to be further updated. On the contrary, when the first message does not carry the second instruction information, if the terminal determines that the first message does not carry the second instruction information, the terminal determines that the access stratum key does not need to be updated.

According to the method A or the method B, the terminal may be instructed not to update the access stratum key, so that the terminal generates the first integrity protection key by using the current access stratum key.

For operation 304, after obtaining the first encryption algorithm and the first integrity protection algorithm, the terminal subsequently communicates with the target base station by using the two algorithms.

For example, the connection resume completion message sent by the terminal to the target base station in operation 304 is protected based on the first encryption algorithm and the first integrity protection algorithm, and then is sent to the target base station.

A specific process in which the terminal obtains the protected connection resume completion message based on the first encryption algorithm, the first integrity protection algorithm, and the connection resume completion message may be, for example, that the terminal first encrypts the connection resume completion message. A specific process may be: obtaining the first encryption key based on the first encryption algorithm, and then encrypting the connection resume completion message based on the first encryption algorithm and the first encryption key, to obtain the encrypted connection resume completion message. Further, integrity protection is performed on the encrypted connection resume completion message. A specific process is: generating the first integrity protection key based on the first integrity protection algorithm, and then performing integrity protection on the encrypted connection resume completion message based on the first integrity protection algorithm and the first integrity protection key, to obtain the protected connection resume completion message.

A specific process in which the terminal obtains the protected connection resume completion message based on the first encryption algorithm, the first integrity protection algorithm, and the connection resume completion message may alternatively be, for example, that the terminal first performs integrity protection on the connection resume completion message. A specific process may be: generating the first integrity protection key based on the first integrity protection algorithm, and then performing integrity protection on the connection resume completion message based on the first integrity protection algorithm and the first integrity protection key, to obtain the connection resume completion message on which integrity protection has been performed. Further, a specific process of encrypting the connection resume completion message on which integrity protection has been performed is: obtaining the first encryption key based on the first encryption algorithm, and then encrypting, based on the first encryption algorithm and the first encryption key, the connection resume completion message on which integrity protection has been performed, to obtain the protected connection resume completion message.

It should be noted that, in the foregoing process of generating the protected connection resume completion message, if the first encryption key and the first integrity protection key are already generated previously, the first encryption key and the first integrity protection key may be directly used without being regenerated, thereby reducing overheads.

Correspondingly, after receiving the protected connection resume completion message, the base station performs decryption and integrity check on the protected connection resume completion message. For a specific implementation process, refer to the foregoing implementation process of performing, by the terminal, decryption and integrity check on the connection resume response message. Details are not described herein again.

In an implementation, if the foregoing operation 303 is implemented by using the foregoing seventh implementation method, further, the following operation may be further included between operation 303 and operation 304.

Operation C1. The terminal sends a second message to the target base station, and correspondingly, the target base station receives the second message.

The second message is used to respond to the first message. Optionally, the second message may be a security command completion message or an RRC reconfiguration completion message.

In one embodiment, if the foregoing operation 303 is implemented by using the foregoing seventh implementation method, further, the following steps may be further included between operation 303 and operation 304.

Operation C2. The target base station performs integrity protection on the connection resume response message based on the first encryption algorithm and the first integrity protection algorithm, where the connection resume response message is used to instruct the terminal to resume the RRC connection.

Operation C3. The target base station sends the connection resume response message to the terminal, and correspondingly, the terminal receives the connection resume response message.

In one embodiment, operation C1 may be performed while operation C2 and operation C3 are performed. To be specific, after operation 303, operation C1 is first performed, then operation C2 is performed, then operation C3 is performed, and then operation 304 is performed.

Figure 4:
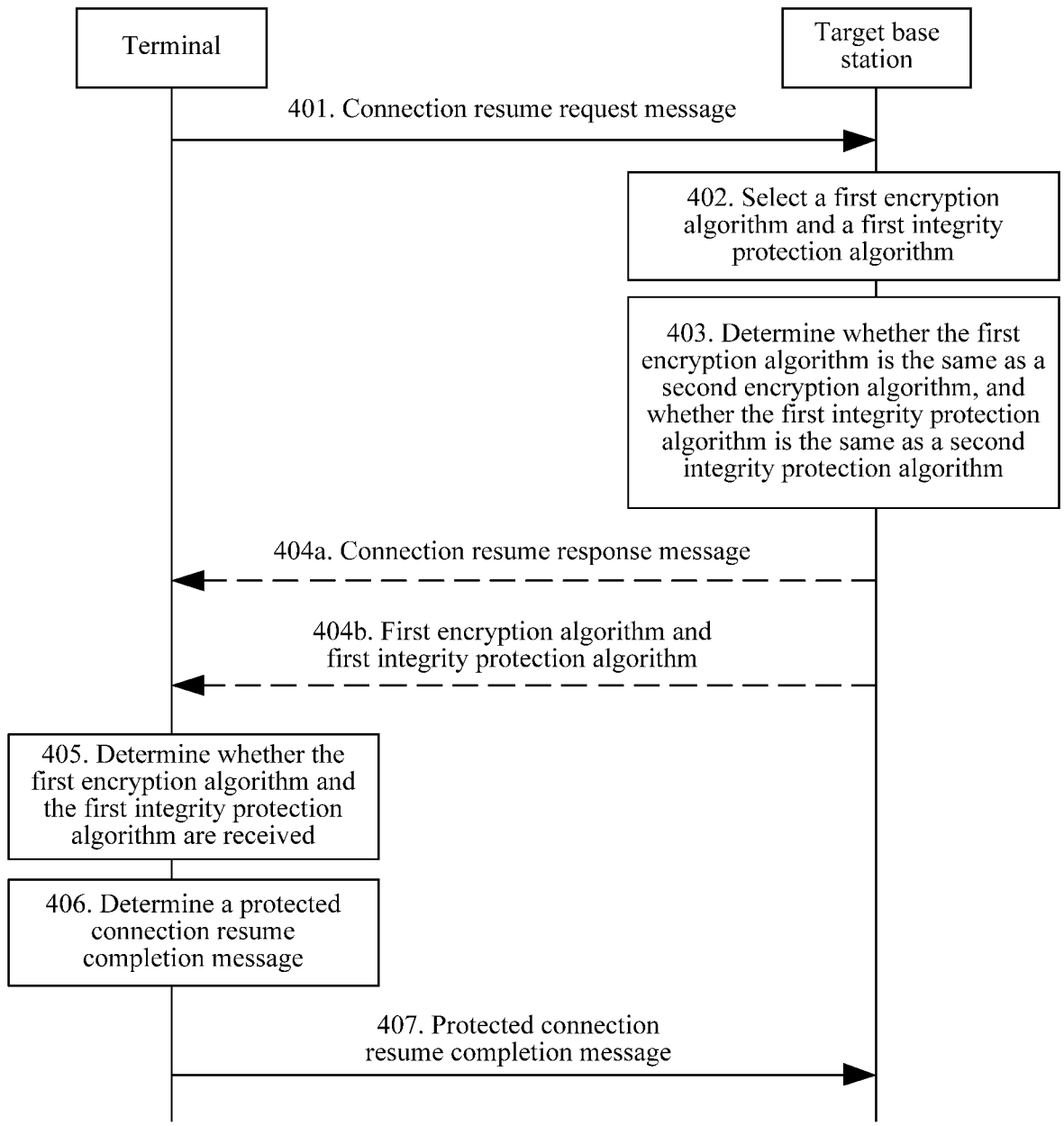
FIG. 4 is a schematic diagram of another RRC connection resume method according to one embodiment

FIG. 4 shows another RRC connection resume method according to an embodiment. A main difference between the RRC connection resume method shown in FIG. 4 and the RRC connection resume method shown in FIG. 3 lies in: In the RRC connection resume method shown in FIG. 4, after generating a first encryption algorithm and a first integrity protection algorithm, a target base station further determines whether the first encryption algorithm is the same as a second encryption algorithm and whether the first integrity protection algorithm is the same as a second integrity protection algorithm, and determines, based on a determining result, a manner of notifying the terminal.

Correspondingly, after receiving a notification from the target base station, a terminal needs to first determine whether an encryption algorithm and an integrity protection algorithm that are sent by the target base station are received, and determine, based on a determining result, a manner of generating a protected connection resume completion message.

The following specifically describes including the following operations, as shown in FIG. 4.

Operations 401 and 402 are the same as the foregoing operation 301 and operation 302. Refer to the foregoing descriptions. Details are not described again.

Operation 403. The target base station determines whether the first encryption algorithm is the same as the second encryption algorithm, and determines whether the first integrity protection algorithm is the same as the second integrity protection algorithm. If the first encryption algorithm is the same as the second encryption algorithm, and the first integrity protection algorithm is the same as the second integrity protection algorithm, operation 404a is performed. If the first encryption algorithm is different from the second encryption algorithm, or the first integrity protection algorithm is different from the second integrity protection algorithm, operation 404b is performed.

Operation 404a. The target base station sends a connection resume response message to the terminal, and the terminal receives the connection resume response message from the target base station.

The connection resume response message is used to instruct the terminal to resume an RRC connection. The connection resume response message is encrypted based on the second encryption algorithm and the second key, and integrity protection is performed on the connection resume response message by using the second integrity protection algorithm and the second integrity protection key.

In operation 404a, because the first encryption algorithm selected by the target base station is the same as the second encryption algorithm, and the first integrity protection algorithm is the same as the second integrity protection algorithm, the target base station does not send the selected first encryption algorithm and the second encryption algorithm to the terminal.

After operation 404a, operation 405 is performed.

Operation 404b. The target base station sends the first encryption algorithm and the first integrity protection algorithm to the terminal, and the terminal receives the first encryption algorithm and the first integrity protection algorithm from the target base station.

In operation 404b, for a specific implementation process in which the target base station sends the first encryption algorithm and the first integrity protection algorithm to the terminal, refer to the foregoing several implementation methods in operation 303. Details are not described herein again.

After operation 404b, operation 405 is performed.

Operation 405. The terminal determines whether the first encryption algorithm and the first integrity protection algorithm from the target base station are received. A determining result is that the first encryption algorithm and the first integrity protection algorithm that are from the target base station are received, or that the first encryption algorithm and the first integrity protection algorithm that are from the target base station are not received.

Operation 406. The terminal determines the protected connection resume completion message.

In operation 406, when the terminal determines the protected connection resume completion message, refer to the determining result in operation 405.

The terminal obtains the protected connection resume completion message based on the first encryption algorithm, the first integrity protection algorithm, and the connection resume completion message if the terminal determines that the first encryption algorithm and the first integrity protection algorithm that are from the target base station are received in operation 405. For a specific implementation process, refer to the descriptions of operation 304. Details are not described herein again.

The terminal obtains the protected connection resume completion message based on the second encryption algorithm, the second integrity protection algorithm, and the connection resume completion message if the terminal determines that the first encryption algorithm and the first integrity protection algorithm that are from the target base station are not received in operation 405. A specific implementation process is similar to that in operation 304. Refer to the foregoing related descriptions. Details are not described herein again.

Operation 407. The terminal sends the protected connection resume completion message to the target base station, and the target base station receives the protected connection resume completion message from the terminal.

After receiving the protected connection resume completion message, the target base station performs decryption and integrity check on the protected connection resume completion message based on the determining result of the target base station in operation 403.

If the first encryption algorithm is the same as the second encryption algorithm, and the first integrity protection algorithm is the same as the second integrity protection algorithm, the connection resume completion message is obtained based on the protected connection resume completion message, the second encryption algorithm, and the second integrity protection algorithm.

If the first encryption algorithm is different the second encryption algorithm, or the first integrity protection algorithm is different from the second integrity protection algorithm, the target base station obtains the connection resume completion message based on the protected connection resume completion message, the first encryption algorithm, and the first integrity protection algorithm.

In the method, according to the operations shown in FIG. 4, when the terminal moves to the target base station, the target base station may reselect, based on a capability and a requirement of the target base station, the first encryption algorithm and the first integrity protection algorithm that are used when the target base station communicates with the terminal. If the target base station determines that the first encryption algorithm is the same as the second encryption algorithm and that the first integrity protection algorithm is the same as the second integrity protection algorithm, the target base station does not send the selected first encryption algorithm and the selected first integrity protection algorithm to the terminal. Correspondingly, if the terminal determines that the first encryption algorithm and the first integrity protection algorithm are not received, the terminal generates the protected connection resume completion message by using the second encryption algorithm and the second integrity protection algorithm. If the target base station determines that the first encryption algorithm is different from the second encryption algorithm or that the first integrity protection algorithm is different from the second integrity protection algorithm, the target base station sends the first encryption algorithm and the first integrity protection algorithm to the terminal. Correspondingly, if the terminal determines that the first encryption algorithm and the first integrity protection algorithm are received, the terminal generates the protected connection resume completion message by using the first encryption algorithm and the first integrity protection algorithm. On one hand, a security algorithm used for communication between the terminal and the target base station is flexibly selected. On the other hand, because the base station connected to the terminal changes, communication security can be improved by using a new encryption algorithm and integrity protection algorithm.

In addition, because in the embodiment shown in FIG. 4, compared with the embodiment shown in FIG. 3, determining actions of the target base station and the terminal are separately added, when the target base station determines that the first encryption algorithm is the same as the second encryption algorithm and that the first integrity protection algorithm is the same as the second integrity protection algorithm, the target base station does not send the first encryption algorithm and the first integrity protection algorithm to the terminal, thereby reducing overheads.

It should be noted that the connection resume request message, the connection resume response message, the connection resume completion message, the context request message, the context response message, and the like in the foregoing embodiments are merely names, and the names do not constitute a limitation to the messages. In a 5G network and another future network, the connection resume request message, the connection resume response message, the connection resume completion message, the context request message, and the context response message may alternatively be other names. This is not specifically limited in this embodiment of this application. For example, the connection resume request message may be replaced with a request message, a resume request message, a connection request message, or the like; the connection resume response message may be replaced with a response message, a resume response message, a connection response message, or the like; the connection resume completion message may be replaced with a completion message, a resume completion message, a connection completion message, or the like; the context request message may be replaced with a request message, or the context response message may be replaced with a response message or the like.

The solutions provided in this application are described above mainly from a perspective of interaction between network elements. It may be understood that, the network elements include corresponding hardware structures and/or software modules for performing the foregoing functions. A person skilled in the art should easily be aware that, in combination with the examples described in the embodiments disclosed in this specification, units and algorithms operations may be implemented by hardware or a combination of hardware and computer software. Whether a function is performed by hardware or hardware driven by computer software depends on particular applications and design constraints of the technical solutions. A person skilled in the art may use different a method to implement the described function for each particular application, but it should not be considered that the implementation goes beyond the scope of the present invention.

Figure 5:
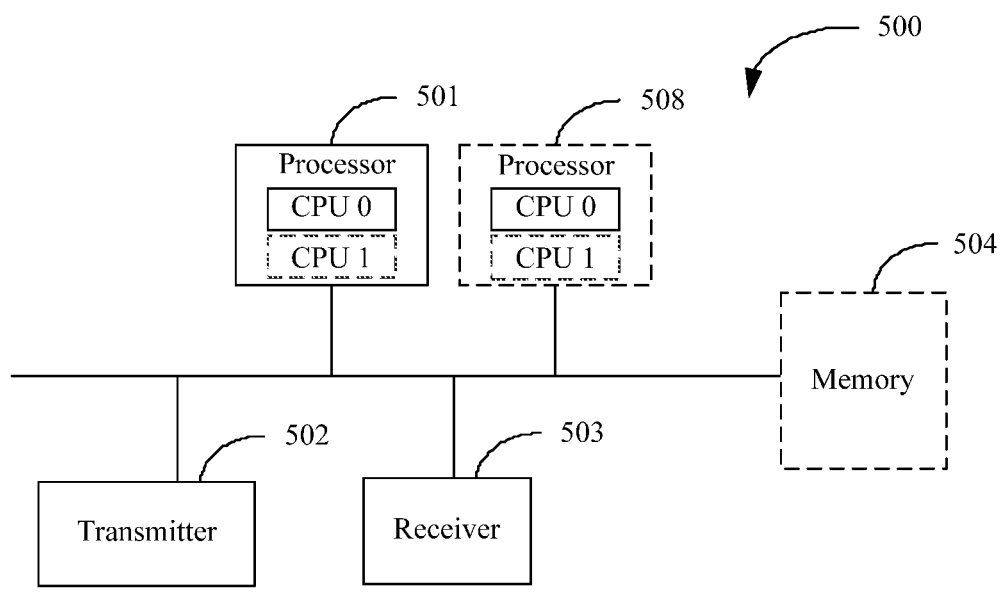
FIG. 5 is a schematic diagram of an apparatus according to one embodiment.

Based on a same inventive concept, FIG. 5 is a schematic diagram of an apparatus according to this embodiment. The apparatus may be a terminal or a base station, and may perform a method performed by the terminal or the target base station in any one of the foregoing embodiments.

The apparatus 500 includes at least one processor 501, a transmitter 502, and a receiver 503. Optionally, the apparatus 500 further includes a memory 504. The processor 501, the transmitter 502, the receiver 503, and the memory 504 are connected by using a communications line.

The processor 501 may be a general-purpose central processing unit (CPU), a microprocessor, an application-specific integrated circuit (ASIC), or one or more integrated circuits configured to control program execution in the solutions of the present invention.

The communications line may include a path for transmitting information between the foregoing units.

The transmitter 502 and the receiver 503 are configured to communicate with another device or a communications network. The transmitter and the receiver include a radio frequency circuit.

The memory 504 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory 504 may exist independently, and be connected to the processor 501 by using the communications line. Alternatively, the memory 504 may be integrated into the processor. The memory 504 is configured to store application program code for executing the solutions of the present invention, and the processor 501 controls the execution. The processor 501 is configured to execute the application program code stored in the memory 504.

During specific implementation, in an embodiment, the processor 501 may include one or more CPUs, such as a CPU 0 and a CPU 1 in FIG. 5.

In a specific implementation, in an embodiment, the apparatus 500 may include a plurality of processors, for example, the processor 501 and a processor 508 shown in FIG. 5. Each of the processors may be a single-core (single-CPU) processor, or may be a multi-core (multi-CPU) processor. Herein, the processor may refer to one or more devices, circuits, and/or processing cores for processing data (for example, a computer program instruction).

It should be understood that when the apparatus 500 is a terminal, the apparatus 500 may be configured to implement the operations performed by the terminal in the method in this embodiment of the present invention. For example, the apparatus 500 may perform operation 301, operation 304, and operation 305 in FIG. 3, or may perform operation 401 and operation 405 to operation 407 in FIG. 4. For related features, refer to the foregoing descriptions. Details are not described herein again. When the apparatus 500 is a base station, the apparatus 500 may be configured to implement the operations performed by the target base station in the method in this embodiment of the present invention. For example, the apparatus 500 may perform operation 302 and operation 303 in FIG. 3, or may perform operation 402, operation, operation 404*a*, and operation 404*b* in FIG. 4. For related features, refer to the foregoing descriptions. Details are not described herein again.

In specific implementation, the actions of the terminal in FIG. 2 to FIG. 4 may be performed by the processor 501 (and/or the processor 508) in the apparatus 500 by invoking the application program code stored in the memory 504. This is not limited in this embodiment of this application.

Figure 6:
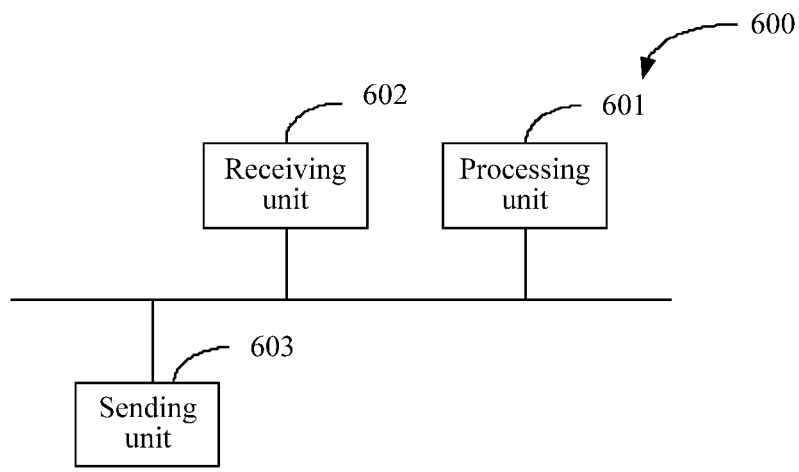
FIG. 6 is a schematic diagram of another apparatus according to one embodiment.

In this embodiment, the terminal may be divided into functional modules based on the foregoing method examples. For example, functional modules may be obtained through division based on corresponding functions, or at least two functions may be integrated into one processing module. The integrated module may be implemented in a form of hardware, or may be implemented in a form of a software functional module. It should be noted that, in this embodiment, module division is exemplary, and is merely a logical function division. In actual implementation, another division manner may be used. For example, when the functional modules are obtained through division based on the corresponding functions, FIG. 6 is a schematic diagram of an apparatus. The apparatus 600 may be the terminal in the foregoing embodiment. The apparatus 600 includes a processing unit 601, a receiving unit 602, and a sending unit 603.

In an implementation of the RRC connection resume method:

The sending unit 603 is configured to send a connection resume request message to a target base station, where the connection resume request message is used to request to resume a radio resource control RRC connection;

the processing unit 601 is configured to: obtain, by using the receiving unit 602, a first encryption algorithm and a first integrity protection algorithm that are from the target base station, where the first encryption algorithm is an encryption algorithm negotiated by the terminal and the target base station, and the first integrity protection algorithm is an integrity protection algorithm negotiated by the terminal and the target base station; and obtain a protected connection resume completion message based on the first encryption algorithm, the first integrity protection algorithm, and a connection resume completion message, where the connection resume completion message is used to indicate that the RRC connection has been resumed; and the sending unit 603 is further configured to send the protected connection resume completion message to the target base station.

In a possible design, the receiving unit 602 is specifically configured to receive a connection resume response message from the target base station, where the connection resume response message includes the first encryption algorithm and the first integrity protection algorithm, the connection resume response message is used to instruct the terminal to resume the RRC connection, the connection resume response message is encrypted based on a second encryption key, the second encryption key is generated based on a second encryption algorithm, and the second encryption algorithm is an encryption algorithm negotiated by the terminal and a source base station; and the processing unit 601 is specifically configured to: generate the second encryption key based on the second encryption algorithm, and decrypt the connection resume response message based on the second encryption key and the second encryption algorithm; and obtain the first encryption algorithm and the first integrity protection algorithm from the decrypted connection resume response message.

In a possible design, integrity protection is performed on the connection resume response message based on a second integrity protection key and a second integrity protection algorithm, the second integrity protection key is generated based on the second integrity protection algorithm, and the second integrity protection algorithm is an integrity protection algorithm negotiated by the terminal and the source base station; and the processing unit 601 is further configured to: generate the second integrity protection key based on the second integrity protection algorithm; and perform integrity check on the connection resume response message based on the second integrity protection key and the second integrity protection algorithm.

In a possible design, the receiving unit 602 is specifically configured to: receive a connection resume response message and the first encryption algorithm that are from the target base station, where the connection resume response message includes the first integrity protection algorithm, the connection resume response message is used to instruct the terminal to resume the RRC connection, the connection resume response message is encrypted based on a first encryption key and the first encryption algorithm, and the first encryption key is generated based on the first encryption algorithm; obtain the first encryption algorithm, and generating the first encryption key based on the first encryption algorithm; and the processing unit 601 is specifically configured to decrypt the connection resume response message based on the first encryption key and the first encryption algorithm, and obtaining the first integrity protection algorithm from the decrypted connection resume response message.

In a possible design, the receiving unit 602 is specifically configured to receive a connection resume response message, the first encryption algorithm, and the first integrity protection algorithm that are from the target base station, where the connection resume response message is used to instruct the terminal to resume the RRC connection, the connection resume response message is encrypted based on a first encryption key and the first encryption algorithm, and the first encryption key is generated based on the first encryption algorithm.

In a possible design, integrity protection is performed on the connection resume response message based on a first integrity protection key and the first integrity protection algorithm, and the first integrity protection key is generated based on the first integrity protection algorithm; and the processing unit 601 is further configured to: generate the first integrity protection key based on the first integrity protection algorithm; and perform integrity check on the connection resume response message based on the first integrity protection key and the first integrity protection algorithm.

In another implementation of the RRC connection resume method:

The sending unit 603 is configured to send a connection resume request message to a target base station, where the connection resume request message is used to request to resume a radio resource control RRC connection;

the processing unit 601 is specifically configured to: obtain a protected connection resume completion message based on a second encryption algorithm, a second integrity protection algorithm, and the connection resume completion message if the receiving unit 602 does not receive a first encryption algorithm and a first integrity protection algorithm that are from the target base station, or obtain a protected connection resume completion message based on a first encryption algorithm, a first integrity protection algorithm, and the connection resume completion message if the receiving unit 602 receives the first encryption algorithm and the first integrity protection algorithm that are from the target base station; and the sending unit 603 is further configured to send the protected connection resume completion message to the target base station, where the first encryption algorithm is an encryption algorithm and an integrity protection algorithm that are negotiated by the terminal and the target base station, the first integrity protection algorithm is an integrity protection algorithm negotiated by the terminal and the target base station, the second encryption algorithm is an encryption algorithm negotiated by the terminal and a source base station, the second integrity protection algorithm is an integrity protection algorithm negotiated by the terminal and the source base station, and the connection resume completion message is used to indicate that the RRC connection has been resumed.

It should be understood that, the terminal may be configured to implement operations performed by the terminal in the method in the embodiments of the present invention. For related features, refer to the foregoing descriptions. Details are not described herein again.

Figure 7:
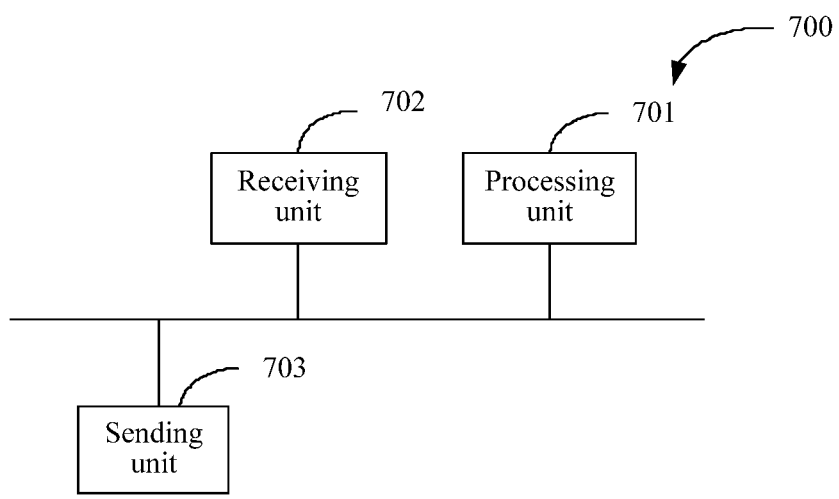
FIG. 7 is a schematic diagram of another apparatus according to one embodiment.

In this embodiment, the target base station may be divided into functional modules based on the foregoing method examples. For example, functional modules may be obtained through division based on corresponding functions, or at least two functions may be integrated into one processing module. The integrated module may be implemented in a form of hardware, or may be implemented in a form of a software functional module. It should be noted that, in this embodiment, module division is exemplary, and is merely a logical function division. In actual implementation, another division manner may be used. For example, when the functional modules are obtained through division based on the corresponding functions, FIG. 7 is a schematic diagram of an apparatus. The apparatus 700 may be the target base station in the foregoing embodiment. The apparatus 700 includes a processing unit 701, a receiving unit 702, and a sending unit 703.

In an implementation of the RRC connection resume method:

The receiving unit 702 is configured to receive a connection resume request message from a terminal, where the connection resume request message is used to request to resume a radio resource control RRC connection;

the processing unit 701 is configured to select a first encryption algorithm and a first integrity protection algorithm based on a security capability of the terminal, where the security capability of the terminal includes an encryption algorithm and an integrity protection algorithm that are supported by the terminal;

the sending unit 703 is configured to send the first encryption algorithm and the first integrity protection algorithm to the terminal;

the receiving unit 702 is further configured to receive a protected connection resume completion message from the terminal, where the connection resume completion message is used to indicate that the RRC connection has been resumed; and the processing unit 701 is further configured to obtain the connection resume completion message based on the protected connection resume completion message, the first encryption algorithm, and the first integrity protection algorithm.

In a possible design, the receiving unit 702 is further configured to receive a second encryption algorithm from a source base station, where the second encryption algorithm is an encryption algorithm negotiated by the terminal and the source base station;

the processing unit 701 is further configured to: generate a second encryption key based on the second encryption algorithm; and encrypt a connection resume response message based on the second encryption key and the second encryption algorithm, where the connection resume response message includes the first encryption algorithm and the first integrity protection algorithm, and the connection resume response message is used to instruct the terminal to resume the RRC connection; and the sending unit 703 is specifically configured to send the encrypted connection resume response message to the terminal.

In a possible design, the processing unit 701 is further configured to: generate a second integrity protection key based on a second integrity protection algorithm, where the second integrity protection algorithm is an integrity protection algorithm negotiated by the terminal and the source base station; and perform integrity protection on the connection resume response message based on the second integrity protection key and the second integrity protection algorithm.

In a possible design, the processing unit 701 is further configured to: generate a first encryption key based on the first encryption algorithm; and encrypt the connection resume response message based on the first encryption key and the first encryption algorithm, where the connection resume response message includes the first integrity protection algorithm, and the connection resume response message is used to instruct the terminal to resume the RRC connection; and the sending unit 703 is specifically configured to send the connection resume response message and the first encryption algorithm to the terminal.

In a possible design, the processing unit 701 is further configured to: generate a first encryption key based on the first encryption algorithm; and encrypt the connection resume response message based on the first encryption key and the first encryption algorithm, where the connection resume response message is used to instruct the terminal to resume the RRC connection; and the sending unit 703 is specifically configured to send the connection resume response message, the first encryption algorithm, and the first integrity protection algorithm to the terminal.

In a possible design, the processing unit 701 is further configured to: generate a first integrity protection key based on the first integrity protection algorithm; and perform integrity protection on the connection resume response message based on the first integrity protection key and the first integrity protection algorithm.

In another implementation of the RRC connection resume method:

The receiving unit 702 is configured to receive a connection resume request message from a terminal, where the connection resume request message is used to request to resume a radio resource control RRC connection;

the processing unit 701 is configured to select a first encryption algorithm and a first integrity protection algorithm based on a security capability of the terminal, where the security capability of the terminal includes an encryption algorithm and an integrity protection algorithm that are supported by the terminal;

the sending unit 703 is configured to: if the first encryption algorithm is the same as a second encryption algorithm, and the first integrity protection algorithm is the same as a second integrity protection algorithm, send a connection resume response message to the terminal; and the receiving unit 702 is configured to receive a protected connection resume completion message from the terminal, and obtain the connection resume completion message based on the protected connection resume completion message, the second encryption algorithm, and the second integrity protection algorithm; or the sending unit 703 is configured to: if the first encryption algorithm is different from a second encryption algorithm, or the first integrity protection algorithm is different from a second integrity protection algorithm, send the first encryption algorithm and the first integrity protection algorithm to the terminal; and the receiving unit 702 is configured to receive a protected connection resume completion message from the terminal, and obtain the connection resume completion message based on the protected connection resume completion message, the first encryption algorithm, and the first integrity protection algorithm, where the first encryption algorithm is an encryption algorithm and an integrity protection algorithm that are negotiated by the terminal and the target base station, the first integrity protection algorithm is an integrity protection algorithm negotiated by the terminal and the target base station, the second encryption algorithm is an encryption algorithm negotiated by the terminal and a source base station, the second integrity protection algorithm is an integrity protection algorithm negotiated by the terminal and the source base station, the connection resume response is used to instruct the terminal to resume the RRC connection, and the connection resume completion message is used to indicate that the RRC connection has been resumed.

It should be understood that, the base station may be configured to implement operations performed by the target base station in the method in the embodiments of the present invention. For related features, refer to the foregoing descriptions. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

Although the present invention is described with reference to the embodiments, in a process of implementing the present invention that claims protection, persons skilled in the art may understand and implement another variation of the disclosed embodiments by viewing the accompanying drawings, disclosed content, and the accompanying claims.

In the claims, "comprising" does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer readable storage medium, or a computer program product. Therefore, this application may use a form of hardware only embodiments, software only embodiments, or embodiments with a combination of software and hardware. They are collectively referred to as "modules" or "systems".

A person skilled in the art may further understand that various illustrative logical blocks and operations that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Operations of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

These computer program instructions may also be loaded onto a computer or another programmable data processing device, so that a series of operations and operations are performed on the computer or another programmable device, thereby generating computer-implemented processing. Therefore, the instructions executed on the computer or the another programmable device provide operations for implementing a specific function in one or more processes in the flowcharts and/or in one or more blocks in the block diagrams.

Although the present invention is described with reference to specific features and the embodiments thereof, obviously, various modifications and combinations may be made to them without departing from the scope of the present invention. Correspondingly, the specification and accompanying drawings are merely exemplary descriptions of the present invention defined by the accompanying claims, and is considered as any of or all modifications, variations, combinations or equivalents that cover the scope of the present invention. Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A radio resource control (RRC) connection resume method, comprising:
    sending, by a terminal, a connection resume request message to a target base station, wherein the connection resume request message requests to resume a RRC connection;
    obtaining, by the terminal, a first encryption algorithm and a first integrity protection algorithm from the target base station, wherein each of the first encryption algorithm and the first integrity protection algorithm is negotiated by the terminal and the target base station;
    obtaining, by the terminal, a protected connection resume completion message based on the first encryption algorithm, the first integrity protection algorithm, and a connection resume completion message, wherein the connection resume completion message indicates that the RRC connection has been resumed, wherein the obtaining of the protected connection resume completion message comprises:
        encrypting the connection resume completion message based on the first encryption algorithm and a first encryption key to obtain an encrypted connection resume completion message,
        performing integrity protection on the encrypted connection resume completion message based on the first integrity protection algorithm and a first integrity protection key to obtain the protected connection resume completion message,
        wherein the first encryption key is generated by the terminal based on an access stratum key, an identifier of the first encryption algorithm, and a type of the first encryption algorithm, wherein the first integrity protection key is generated by the terminal based on the access stratum key, an identifier of the first integrity protection algorithm, and a type of the first integrity protection algorithm; and
    sending, by the terminal, the protected connection resume completion message to the target base station.

2. The method according to claim 1, wherein the obtaining, by the terminal, of the first encryption algorithm and the first integrity protection algorithm from the target base station comprises:
    receiving, by the terminal, a connection resume response message from the target base station, wherein the connection resume response message comprises the first encryption algorithm and the first integrity protection algorithm, the connection resume response message instructs the terminal to resume the RRC connection, the connection resume response message is encrypted based on a second encryption key, the second encryption key is generated based on a second encryption algorithm, and the second encryption algorithm is negotiated by the terminal and a source base station;
generating, by the terminal, the second encryption key based on the second encryption algorithm, and decrypting the connection resume response message based on the second encryption key and the second encryption algorithm; and
obtaining, by the terminal, the first encryption algorithm and the first integrity protection algorithm from the decrypted connection resume response message.

3. The method according to claim 2, wherein integrity protection is performed on the connection resume response message based on a second integrity protection key and a second integrity protection algorithm, wherein the second integrity protection key is generated based on the second integrity protection algorithm, and wherein the second integrity protection algorithm is negotiated by the terminal and the source base station; and
wherein the method further comprises:
generating, by the terminal, the second integrity protection key based on the second integrity protection algorithm; and
performing, by the terminal, integrity check on the connection resume response message based on the second integrity protection key and the second integrity protection algorithm.

4. The method according to claim 1, wherein the obtaining, by the terminal, of the first encryption algorithm and the first integrity protection algorithm from the target base station comprises:
receiving, by the terminal, a connection resume response message and the first encryption algorithm from the target base station, wherein the connection resume response message comprises the first integrity protection algorithm, wherein the connection resume response message instructs the terminal to resume the RRC connection, wherein the connection resume response message is encrypted based on the first encryption key and the first encryption algorithm;
obtaining, by the terminal, the first encryption algorithm, and generating the first encryption key based on the first encryption algorithm; and
decrypting, by the terminal, the connection resume response message based on the first encryption key and the first encryption algorithm, and obtaining the first integrity protection algorithm from the decrypted connection resume response message.

5. The method according to claim 1, wherein the obtaining, by the terminal, of the first encryption algorithm and the first integrity protection algorithm from the target base station comprises:
receiving, by the terminal, a connection resume response message, the first encryption algorithm, and the first integrity protection algorithm from the target base station, wherein the connection resume response message instructs the terminal to resume the RRC connection, wherein the connection resume response message is encrypted based on the first encryption key and the first encryption algorithm, and wherein the first encryption key is generated based on the first encryption algorithm.

6. The method according to claim 4, wherein integrity protection is performed on the connection resume response message based on the first integrity protection key and the first integrity protection algorithm, and wherein the first integrity protection key is generated based on the first integrity protection algorithm; and
wherein the method further comprises:
generating, by the terminal, the first integrity protection key based on the first integrity protection algorithm; and
performing, by the terminal, integrity check on the connection resume response message based on the first integrity protection key and the first integrity protection algorithm.

7. The method according to claim 1, wherein the obtaining, by the terminal, of the first encryption algorithm and the first integrity protection algorithm from the target base station comprises:
receiving, by the terminal, a first message from the target base station, wherein the first message comprises the first encryption algorithm and the first integrity protection algorithm; and
wherein the method further comprises:
receiving, by the terminal, a connection resume response message from the target base station after receiving the first message, wherein the connection resume response message is instructs the terminal to resume the RRC connection, and wherein security protection is performed on the connection resume response message based on the first encryption algorithm and the first integrity protection algorithm.

8. The method according to claim 7, wherein integrity protection is performed on the first message based on the first integrity protection key and the first integrity protection algorithm, and wherein the first integrity protection key is generated based on the first integrity protection algorithm; and
wherein the method further comprises:
generating, by the terminal, the first integrity protection key based on the first integrity protection algorithm; and
performing, by the terminal, integrity check on the first message based on the first integrity protection key and the first integrity protection algorithm.

9. The method according to claim 8, wherein the first message further comprises first instruction information, and wherein the first instruction information instructs the terminal not to update the access stratum key; and
wherein the generating, by the terminal, the first integrity protection key based on the first integrity protection algorithm comprises:
generating, by the terminal, the first integrity protection key based on a current access stratum key and the first integrity protection algorithm.

10. The method according to claim 8, wherein the method further comprises:
determining, by the terminal, that the first message does not comprise second instruction information, wherein the second instruction information instructs the terminal to update the access stratum key; and
wherein the generating, by the terminal, the first integrity protection key based on the first integrity protection algorithm comprises:
generating, by the terminal, the first integrity protection key based on a current access stratum key and the first integrity protection algorithm.

11. A radio resource control (RRC) connection resume method, comprising:
- receiving, by a target base station, a connection resume request message from a terminal, wherein the connection resume request message requests to resume a RRC connection;
- selecting, by the target base station, a first encryption algorithm and a first integrity protection algorithm based on a security capability of the terminal, wherein the security capability of the terminal comprises an encryption algorithm and an integrity protection algorithm that are supported by the terminal;
- sending, by the target base station, the first encryption algorithm and the first integrity protection algorithm to the terminal; and
- receiving, by the target base station, a protected connection resume completion message from the terminal, and obtaining a connection resume completion message based on the protected connection resume completion message, the first encryption algorithm, and the first integrity protection algorithm, wherein the connection resume completion message indicates that the RRC connection has been resumed,
- wherein the obtaining of the connection resume completion message comprises:
  - performing integrity check on a protected encrypted connection resume completion message based on the first integrity protection algorithm and a first integrity protection key, and
  - decrypting, based on the first encryption algorithm and a first encryption key, the connection resume completion message on which the integrity check has been successfully performed,
  - wherein the first encryption key is generated by the terminal based on an access stratum key, an identifier of the first encryption algorithm, and a type of the first encryption algorithm, wherein the first integrity protection key is generated based on the access stratum key, an identifier of the first integrity protection algorithm, and a type of the first integrity protection algorithm.

12. The method according to claim 11, wherein the method further comprises:
- receiving, by the target base station, a second encryption algorithm from a source base station, wherein the second encryption algorithm is negotiated by the terminal and the source base station; and
- wherein the sending, by the target base station, the first encryption algorithm and the first integrity protection algorithm to the terminal comprises:
- generating, by the target base station, a second encryption key based on the second encryption algorithm;
- encrypting, by the target base station, a connection resume response message based on the second encryption key and the second encryption algorithm, wherein the connection resume response message comprises the first encryption algorithm and the first integrity protection algorithm, and the connection resume response message is used to instruct the terminal to resume the RRC connection; and
- sending, by the target base station, the encrypted connection resume response message to the terminal.

13. The method according to claim 12, wherein the method further comprises:
- generating, by the target base station, a second integrity protection key based on a second integrity protection algorithm, wherein the second integrity protection algorithm is negotiated by the terminal and the source base station; and
- performing, by the target base station, integrity protection on the connection resume response message based on the second integrity protection key and the second integrity protection algorithm.

14. The method according to claim 13, wherein the sending, by the target base station, of the first encryption algorithm and the first integrity protection algorithm to the terminal comprises:
- generating, by the target base station, the first encryption key based on the first encryption algorithm;
- encrypting, by the target base station, the connection resume response message based on the first encryption key and the first encryption algorithm, wherein the connection resume response message comprises the first integrity protection algorithm, and the connection resume response message is used to instruct the terminal to resume the RRC connection; and
- sending, by the target base station, the connection resume response message and the first encryption algorithm to the terminal.

15. The method according to claim 13, wherein the sending, by the target base station, of the first encryption algorithm and the first integrity protection algorithm to the terminal comprises:
- generating, by the target base station, the first encryption key based on the first encryption algorithm;
- encrypting, by the target base station, the connection resume response message based on the first encryption key and the first encryption algorithm, wherein the connection resume response message is used to instruct the terminal to resume the RRC connection; and
- sending, by the target base station, the connection resume response message, the first encryption algorithm, and the first integrity protection algorithm to the terminal.

16. The method according to claim 14, wherein the method further comprises:
- generating, by the target base station, the first integrity protection key based on the first integrity protection algorithm; and
- performing, by the target base station, integrity protection on the connection resume response message based on the first integrity protection key and the first integrity protection algorithm.

17. A terminal, comprising:
- a processor; and
- a memory coupled with the processor and storing program instructions, which, when executed by the processor, cause the terminal to:
- send a connection resume request message to a target base station, wherein the connection resume request message requests to resume a radio resource control (RRC) connection;
- obtain a first encryption algorithm and a first integrity protection algorithm that are from the target base station, wherein each of the first encryption algorithm and the first integrity protection algorithm is negotiated by the terminal and the target base station;
- obtain a protected connection resume completion message based on the first encryption algorithm, the first integrity protection algorithm, and a connection resume completion message, wherein the connection resume completion message indicates that the RRC connection has been resumed, wherein the obtaining of the protected connection resume completion message comprises:

encrypting the connection resume completion message based on the first encryption algorithm and a first encryption key to obtain an encrypted connection resume completion message, performing integrity protection on the encrypted connection resume completion message based on the first integrity protection algorithm and a first integrity protection key to obtain the protected connection resume completion message, wherein the first encryption key is generated by the terminal based on an access stratum key, an identifier of the first encryption algorithm, and a type of the first encryption algorithm, wherein the first integrity protection key is generated by the terminal based on the access stratum key, an identifier of the first integrity protection algorithm, and a type of the first integrity protection algorithm; and send the protected connection resume completion message to the target base station.

18. The terminal according to claim 17, wherein the program instructions further cause terminal to:

receive a connection resume response message from the target base station, wherein the connection resume response message comprises the first encryption algorithm and the first integrity protection algorithm, the connection resume response message instructs the terminal to resume the RRC connection, the connection resume response message is encrypted based on a second encryption key, the second encryption key is generated based on a second encryption algorithm, and the second encryption algorithm is negotiated by the terminal and a source base station;

generate the second encryption key based on the second encryption algorithm, and decrypting the connection resume response message based on the second encryption key and the second encryption algorithm; and obtain the first encryption algorithm and the first integrity protection algorithm from the decrypted connection resume response message.

19. The terminal according to claim 18, wherein integrity protection is performed on the connection resume response message based on a second integrity protection key and a second integrity protection algorithm, and the second integrity protection algorithm is negotiated by the terminal and the source base station; and wherein the program instructions further cause the terminal to:

generate the second integrity protection key based on the second integrity protection algorithm; and perform integrity check on the connection resume response message based on the second integrity protection key and the second integrity protection algorithm.

20. The terminal according to claim 17, wherein the program instructions further cause terminal:

receive a connection resume response message and the first encryption algorithm from the target base station, wherein the connection resume response message comprises the first integrity protection algorithm, wherein the connection resume response message instructs the terminal to resume the RRC connection, wherein the connection resume response message is encrypted based on the first encryption key and the first encryption algorithm;

obtain the first encryption algorithm, and generating the first encryption key based on the first encryption algorithm; and decrypt the connection resume response message based on the first encryption key and the first encryption algorithm, and obtaining the first integrity protection algorithm from the decrypted connection resume response message.

\* \* \* \* \*